US011482223B2

(12) United States Patent
Dua et al.

(10) Patent No.: US 11,482,223 B2
(45) Date of Patent: Oct. 25, 2022

(54) SYSTEMS AND METHODS FOR AUTOMATICALLY DETERMINING UTTERANCES, ENTITIES, AND INTENTS BASED ON NATURAL LANGUAGE INPUTS

(71) Applicant: PricewaterhouseCoopers LLP, New York, NY (US)

(72) Inventors: Suneet Dua, St. Petersburg, FL (US); Luis Beaumier, St. Petersburg, FL (US); Marc Nadeau, St. Petersburg, FL (US); Ryan Edley, Chicago, IL (US); Robert Coen, Tampa, FL (US); Jason Victor Randall, Dunedin, FL (US); Shannon M. Robinson, Memphis, TN (US)

(73) Assignee: PricewaterhouseCoopers LLP, New York, NY (US)

( * ) Notice: Subject to any disclaimer, the term of this patent is extended or adjusted under 35 U.S.C. 154(b) by 277 days.

(21) Appl. No.: 16/836,681

(22) Filed: Mar. 31, 2020

(65) Prior Publication Data
US 2021/0303636 A1    Sep. 30, 2021

(51) Int. Cl.
*G10L 15/22*     (2006.01)
*G06F 16/9032*   (2019.01)
(Continued)

(52) U.S. Cl.
CPC .......... *G10L 15/22* (2013.01); *G06F 16/9038* (2019.01); *G06F 16/90332* (2019.01); *G06F 40/20* (2020.01); *G10L 15/26* (2013.01)

(58) Field of Classification Search
CPC .................................................. G10L 15/22
See application file for complete search history.

(56) References Cited

U.S. PATENT DOCUMENTS 6,789,231 B1 * 9/2004 Reynar ................ G06F 40/274
                                                         704/4
7,685,252 B1    3/2010 Maes et al.
(Continued)

FOREIGN PATENT DOCUMENTS

EP    3407283 A1    11/2018
EP    3557505 A1    10/2019
WO    2018/208491 A1    11/2018

OTHER PUBLICATIONS

Dua et al., U.S. Office Action dated Aug. 30, 2021, directed to U.S. Appl. No. 16/836,634; 29 pages.
(Continued)

*Primary Examiner* — Douglas Godbold
(74) *Attorney, Agent, or Firm* — Morrison & Foerster LLP

(57) ABSTRACT

A language understanding system is configured to process utterances to predict intents of users, including by suggesting utterances and intents based on searches performed by one or more microservices. A central service is configured to receive inputs/queries from a user, to communicate with a plurality of language processing microservices, and to return a response to the user. The microservices may be configured to apply respective search algorithms comparing the input to respective data sources such as databases, indexes, or knowledge graphs. The microservices may rate utterances and/or entities in the respective data sources with respect to the input. The one or more microservices may generate a ranked list and return the ranked list to the central service. The central service may then apply a secondary rating/ranking algorithm in order to select one or more predicted utterances and/or entities to return to the user based on the initial user input.

25 Claims, 12 Drawing Sheets

(51) Int. Cl.
  *G06F 16/9038* (2019.01)
  *G10L 15/26* (2006.01)
  *G06F 40/20* (2020.01)

(56) References Cited

U.S. PATENT DOCUMENTS

| | | | |
|---|---|---|---|
| 7,849,440 | B1 | 12/2010 | Englehart |
| 10,776,725 | B2 | 9/2020 | Ding et al. |
| 11,043,205 | B1* | 6/2021 | Su .................... G10L 15/183 |
| 11,087,739 | B1* | 8/2021 | Rastrow .............. G06F 40/216 |
| 11,170,776 | B1* | 11/2021 | Whalin ................. G10L 15/08 |
| 11,190,466 | B2 | 11/2021 | Whitten et al. |
| 2003/0046316 | A1 | 3/2003 | Gergic et al. |
| 2003/0212543 | A1 | 11/2003 | Epstein et al. |
| 2005/0289124 | A1 | 12/2005 | Kaiser et al. |
| 2010/0115048 | A1 | 5/2010 | Scahill |
| 2010/0138215 | A1* | 6/2010 | Williams ............... G10L 15/22 704/9 |
| 2012/0254143 | A1 | 10/2012 | Varma et al. |
| 2013/0212042 | A1 | 8/2013 | Rosenberg |
| 2014/0136187 | A1 | 5/2014 | Wolverton et al. |
| 2016/0110229 | A1 | 4/2016 | Rector et al. |
| 2016/0364377 | A1 | 12/2016 | Krishnamurthy |
| 2017/0116982 | A1 | 4/2017 | Gelfenbeyn et al. |
| 2017/0206064 | A1 | 7/2017 | Breazeal et al. |
| 2017/0308389 | A1* | 10/2017 | Ducatelle ................ G06F 3/167 |
| 2018/0107461 | A1 | 4/2018 | Balasubramanian et al. |
| 2018/0129484 | A1 | 5/2018 | Kannan et al. |
| 2018/0198827 | A1 | 7/2018 | Eifler et al. |
| 2018/0241764 | A1 | 8/2018 | Nadolski et al. |
| 2018/0276261 | A1 | 9/2018 | Smart |
| 2018/0302346 | A1 | 10/2018 | Xie |
| 2018/0314689 | A1 | 11/2018 | Wang et al. |
| 2019/0073197 | A1 | 3/2019 | Collins |
| 2019/0121801 | A1 | 4/2019 | Jethwa et al. |
| 2019/0163694 | A1 | 5/2019 | Yao |
| 2019/0166069 | A1 | 5/2019 | Yao et al. |
| 2019/0272323 | A1 | 9/2019 | Galitsky |
| 2019/0377619 | A1 | 12/2019 | Riva et al. |
| 2020/0004874 | A1 | 1/2020 | Gupta et al. |
| 2020/0057946 | A1 | 2/2020 | Singaraju et al. |
| 2020/0104402 | A1 | 4/2020 | Burnett et al. |
| 2020/0218766 | A1 | 7/2020 | Yaseen et al. |
| 2020/0312324 | A1* | 10/2020 | Tang ...................... G10L 15/02 |
| 2021/0090575 | A1* | 3/2021 | Mahmood ............... G10L 17/10 |
| 2021/0136008 | A1 | 5/2021 | Whitten et al. |
| 2021/0286950 | A1 | 9/2021 | Quamar et al. |
| 2021/0303578 | A1 | 9/2021 | Dua et al. |
| 2021/0303801 | A1 | 9/2021 | Dua et al. |

OTHER PUBLICATIONS

International Search Report and Written Opinion dated Jun. 18, 2021, directed to International Application No. PCT/US2021/024374; 13 pages.

Dua et al., U.S. Office Action dated Mar. 4, 2021, directed to U.S. Appl. No. 16/836,634; 26 pages.

Camunda. "Modeler," located at <https://www.camunda.com/products/camunda-bpm/modeler/> visited on Aug. 13, 2020; 4 pages.

Dua et al., U.S. Office Action dated Oct. 8, 2021, directed to U.S. Appl. No. 16/836,637; 49 pages.

Dua et al., U.S. Office Action dated Mar. 22, 2022, directed to U.S. Appl. No. 16/836,634; 29 pages.

Dua et al., U.S. Office Action dated Apr. 13, 2022, directed to U.S. Appl. No. 16/836,637; 55 pages.

* cited by examiner

SYSTEMS AND METHODS FOR AUTOMATICALLY DETERMINING UTTERANCES, ENTITIES, AND INTENTS BASED ON NATURAL LANGUAGE INPUTS

FIELD

This disclosure related generally to language processing systems, and more specifically to improved systems and methods for processing spoken and typed natural language inputs, including by generating rated and ranked lists by a plurality of language processing microservices.

BACKGROUND

Natural language understanding (NLU) technology and intent-recognition technology endeavor to process spoken and/or typed user inputs (utterances) and to determine the intent of the user, in order to display desired content to the user and/or execute a conversation model in accordance with the user's inputs. In order to determine the user's desired intent, accurate recognition and parsing of the user's inputted utterances is required, and accurate recognition of any entities referenced by the user's inputted utterances is required.

SUMMARY

Known systems for NLU, intent-recognition, and/or entity recognition are not sufficiently accurate. Particularly in the business intelligence regime, there is a need for improved NLU, intent recognition, and entity recognition systems that can accurately respond to nomenclatures, terminology, and entity names used within various business and enterprise environments. Furthermore, there is a need for improved NLU, intent recognition, and entity recognition systems that use machine learning to improve accuracy and reliability of results. Additionally, there is a need for improved NLU, intent recognition, and entity recognition systems that provide confidence-scored and/or ranked results in response to queries/inputs. Additionally, there is a need for improved NLU, intent recognition, and entity recognition systems that efficiently ingest information from a variety of sources including user interactions, conversation modeling inputs, internal and external system-of-record data points, user caches, NLU results, trends across a firm and/or industry, relationship graphs, indexed data, and other lists of intent/entity values.

The systems, methods, and user interfaces described herein may address one or more of the above needs. In some embodiments, a language understanding system is configured to process utterances to predict intents and entities conveyed by the utterances. In some embodiments, the system includes a central service configured to receive inputs/queries from a user, to communicate with a plurality of language processing microservices, and to return a response to the user. The central service may in some embodiments be referred to as a predictive intent and entity service (PIES). In some embodiments, one or more of the plurality of microservices may be configured to process the input from the user (provided by PIES to the microservice) to apply an algorithm comparing the input to a database, index, knowledge graph, or other data store storing a corpus of utterances and/or entities. One or more of the plurality of microservices may further be configured to rate utterances and/or entities in the index by generating a confidence score for each utterance and/or entity with respect to the input. The one or more microservices may then generate a ranked list and return the ranked list to PIES. PIES may then apply a secondary rating/ranking algorithm in order to select one or more predicted utterances and/or entities to return to the user based on the user's initial input. In accordance with the predicted utterances and/or entities (and, in some embodiments, in accordance with further user input), the system may in some embodiments execute one or more conversation models (and/or, in some embodiments, execute one or more business process models and/or one or more technical processes in a similar manner as described herein).

In some embodiments, a natural language understanding system is provided, the system comprising one or more processors and memory storing instructions configured to be executed by the one or more processors to cause the system to: receive an utterance input from a user; transmit query data regarding the input received from the user to a plurality of language processing microservices, wherein each of the plurality of language processing microservices is configured to: apply a respective algorithm to compare the query data to a respective data source comprising one or more of (1) entities and (2) utterances; apply a respective rating algorithm to generate a ranked list based on the entities and/or utterances represented by the respective data source; and generate a respective query response payload, wherein generating the payload comprises selecting, based on the ranked list, a respective subset of the entities and/or utterances; receive, from each of the plurality of microservices, a respective payload comprising the respective subset of entities and/or utterances along with their associated respective ratings; generate, based on the entities and/or utterances included in ranked lists received from the plurality of microservices, a set of predictive options; and cause display of the set of predictive options to the user, wherein each of the predictive options in the set comprises at least one of the following: (1) a suggested entity, and (2) a suggested utterance.

In some embodiments of the system, the instructions are further configured to cause the system to: detect a predictive option selection input from the user indicating selection of one of the displayed predictive options; in accordance with the predictive option selected by the predictive option selection input, execute an interactive conversation model.

In some embodiments of the system, the selected predictive option comprises a suggested utterance; the instructions are further configured to cause the system to: in response to detecting the predictive option selection input selecting the suggested utterance, display an entity prompt for the user to enter an entity data input; receive an entity data input from the user; in response to receiving the entity data input, forward the entity data input to one or more of the plurality of microservices; receive, from each of the one or more of the plurality of microservices, a respective entity payload comprising a respective set of entities and associated respective ratings; generate, based on the sets of entities received in the one or more entity payloads, a set of suggested entities; cause display of the set of suggested entities to the user.

In some embodiments of the system, the instructions are further configured to cause the system to: detect a suggested entity selection input from the user indicating selection of one of the displayed suggested entities; and in accordance with the suggested entity selected by the suggested entity selection input, execute an interactive conversation model.

In some embodiments of the system, the selected predictive option comprises a suggested entity; the instructions are further configured to cause the system to: in response to detecting the predictive option selection input selecting the suggested entity, display a set of suggested utterances that utilize the selected suggested entity; detect a suggested utterance selection input from the user indicating selection of one of the displayed suggested utterances; and in accordance with the suggested utterance selected by the suggested utterance selection input, execute an interactive conversation model.

In some embodiments of the system, one or more of the respective data sources is configured to be populated by a conversation modeling system.

In some embodiments of the system, one or more of the respective data sources is configured to be populated by an API push/pull request.

In some embodiments of the system, one or more of the respective data sources is configured to be populated by information from a streaming service topic.

In some embodiments of the system, one or more of the respective rating algorithms is configured to assign confidence scores, based on the utterance input, to entities and/or utterances included in the respective data source.

In some embodiments of the system, selecting the respective subset of the entities and/or utterances comprises applying a threshold to the confidence scores.

In some embodiments of the system, the threshold is set in accordance with a highest confidence score among confidence scores for a respective microservice.

In some embodiments of the system, generating the set of predictive options comprises applying a collective ranking algorithm to the entities and/or utterances included in ranked lists received from the plurality of microservices.

In some embodiments of the system, generating the set of predictive options comprises normalizing confidence scores included in the ranked lists received from the plurality of microservices.

In some embodiments of the system, one or more of the plurality of language processing microservices comprises an intent detection service configured to detect one or more intents based on the utterance input.

In some embodiments of the system, one or more of the plurality of language processing microservices comprises an entity extraction service configured to extract one or more entities from the utterance input.

In some embodiments of the system, one or more of the plurality of language processing microservices comprises an utterance lookup service configured to provide suggested utterances based on the utterance input.

In some embodiments of the system, one or more of the plurality of language processing microservices comprises an entity lookup service configured to provide suggested entities based on the utterance input.

In some embodiments of the system, one or more of the plurality of language processing microservices comprises a well-known utterance service configured to provide suggested well-known utterances based on the utterance input.

In some embodiments of the system, one or more of the plurality of language processing microservices comprises a reading comprehension service configured to provide responses based on content extracted from one or more documents.

In some embodiments of the system, one or more of the plurality of language processing microservices comprises an enterprise insights and profiling service configured to provide suggested entities and/or suggested utterances based on the utterance input and a data structure indicating relationship scores among entities and intents.

In some embodiments of the system, the instructions are further configured to cause the system to select the plurality of language processing microservices from a set of available microservices.

In some embodiments of the system, selecting the plurality of microservices is based on the utterance input.

In some embodiments of the system, selecting the plurality of microservices based on the utterance input comprises selecting one or more of the plurality of microservices in accordance with a determination as to whether the utterance input comprises typed characters.

In some embodiments of the system, selecting the plurality of microservices based on the utterance input comprises selecting one or more of the plurality of microservices in accordance with a determination as to whether the utterance input comprises spoken words.

In some embodiments of the system, selecting at least one microservice of the plurality of microservices is based on an output generated by another one of the plurality of microservices.

In some embodiments, a method for natural language understanding is provided, the method configured to be performed by a natural language understanding system comprising one or more processors, the method comprising: receiving an utterance input from a user; transmitting query data regarding the input received from the user to a plurality of language processing microservices, wherein each of the plurality of language processing microservices is configured to: apply a respective algorithm to compare the query data to a respective data source comprising one or more of (1) entities and (2) utterances; apply a respective rating algorithm to generate a ranked list based on the entities and/or utterances represented by the respective data source; and generate a respective query response payload, wherein generating the payload comprises selecting, based on the ranked list, a respective subset of the entities and/or utterances; receiving, from each of the plurality of microservices, a respective payload comprising the respective subset of entities and/or utterances along with their associated respective ratings; generating, based on the entities and/or utterances included in ranked lists received from the plurality of microservices, a set of predictive options; and causing display of the set of predictive options to the user, wherein each of the predictive options in the set comprises at least one of the following: (1) a suggested entity, and (2) a suggested utterance.

In some embodiments, a non-transitory computer-readable storage medium is provided, the storage medium storing instructions for natural language understanding, the instructions configured to be executed by a natural language understanding system comprising one or more processors, the instructions configured to cause the system to: receive an utterance input from a user; transmit query data regarding the input received from the user to a plurality of language processing microservices, wherein each of the plurality of language processing microservices is configured to: apply a respective algorithm to compare the query data to a respective data source comprising one or more of (1) entities and (2) utterances; apply a respective rating algorithm to generate a ranked list based on the entities and/or utterances represented by the respective data source; and generate a respective query response payload, wherein generating the payload comprises selecting, based on the ranked list, a respective subset of the entities and/or utterances; receive, from each of the plurality of microservices, a respective payload comprising the respective subset of entities and/or utterances along with their associated respective ratings;

generate, based on the entities and/or utterances included in ranked lists received from the plurality of microservices, a set of predictive options; and cause display of the set of predictive options to the user, wherein each of the predictive options in the set comprises at least one of the following: (1) a suggested entity, and (2) a suggested utterance.

It will be appreciated that any of the embodiments, aspects, features and options described in view of the system apply equally to the method and computer-readable storage medium, and vice versa. It will also be clear that any one or more of the above embodiments, aspects, features and options can be combined. In some embodiments, any one or more of the characteristics of any one or more of the systems, methods, and/or computer-readable storage mediums recited above may be combined, in whole or in part, with one another and/or with any other features or characteristics described elsewhere herein.

DETAILED DESCRIPTION

Described herein are exemplary embodiments of systems, methods, and/or user interfaces for language processing, intent detection, and entity determination, which may address the problems and shortcomings of known NLU and intent detection systems and methods described above.

Exemplary System

Figure 1:
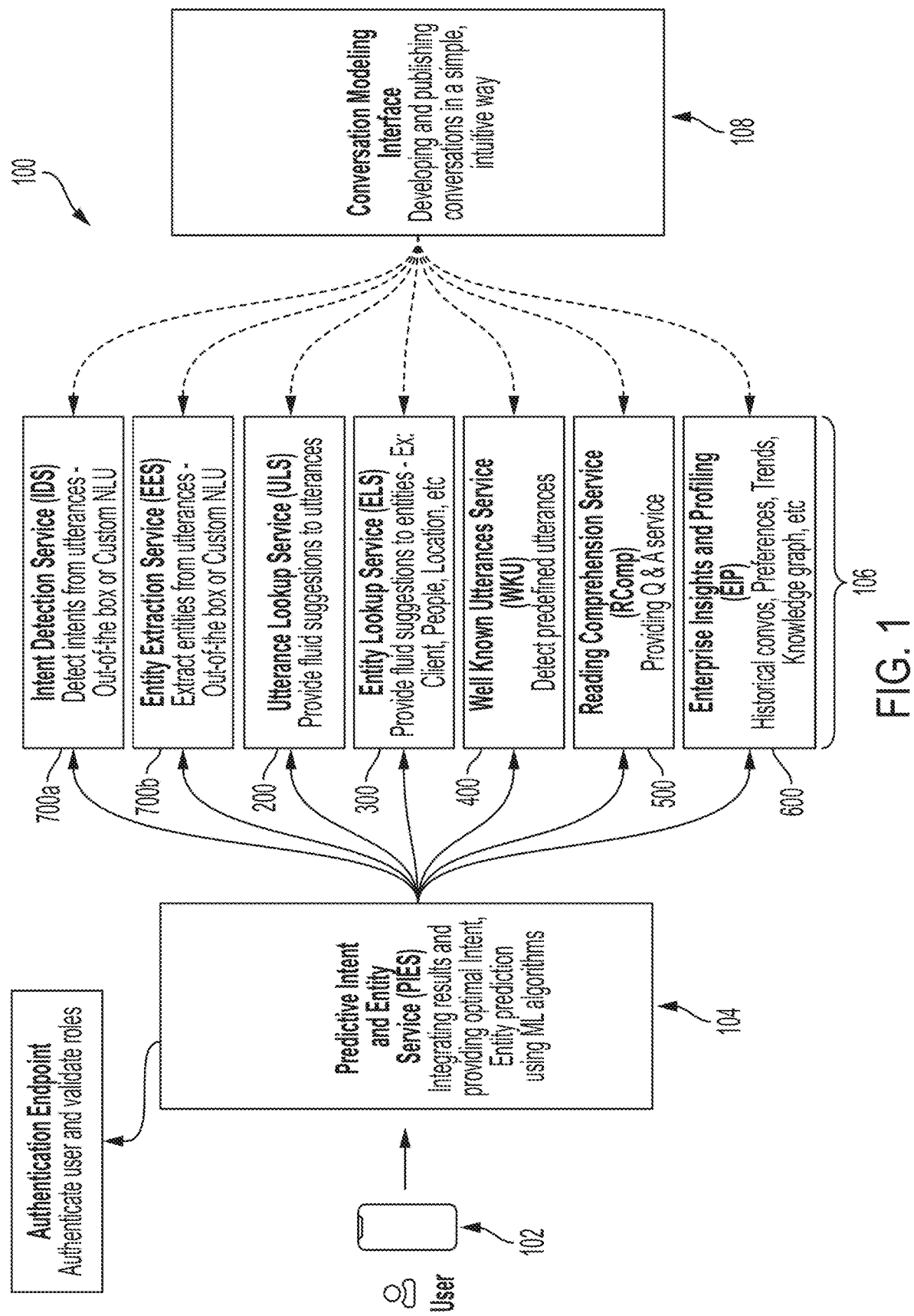
FIG. 1 depicts a system for language processing, in accordance with some embodiments.

FIG. 1 depicts a system 100 for language processing, in accordance with some embodiments. As described below, system 100 may be a computer system configured to detect or receive user input in the form of spoken and/or written language inputs and to call on one or more of a plurality of language processing microservices to interpret the input. The language processing microservices may be configured to determine one or more predicted/suggested intents and/or predicted/suggested entities based on the input, and to each return a ranked list of potential intents/entities. A central predictive intent system responsible for calling the one or more microservices may receive the ranked lists from the microservices and process those lists to evaluate and refine the results, thereby generating one or more predictive utterances, intents, and/or predictive entities. Information returned by the one or more microservices may further include information associated with predictive intents, utterances, and/or entities, including but not limited to entity type, key attributes, and/or keys associated with the matched intents, utterances, and/or entities.

On the basis of the one or more matched predictive intents, utterances, and/or predictive entities, a response may be displayed to the user, a responsive query may be posed to the user, and/or the system 100 may initiate execution of one or more conversation models (and/or one or more technical processes and/or or one or more business process models).

As shown, system 100 may include user device 102, predictive intent system 104, language processing microservices 106, and conversation modeling system 108. In some embodiments, any one or more of the components of system 100 may be implemented as computer hardware and/or software. For example, one or more of the different components of system 100 may be implemented via one or more computer processors, servers, computing instances, or the like. In some embodiments, system 100 may be implemented on a single computing device; in some embodiments, system 100 may be implemented as a distributed network system (e.g., with different devices, modules, or services implemented on separate network components); in some embodiments, system 100 may be implemented as a distributed computing system (e.g., utilizing distributed processors to execute a single task, module, or service). In some embodiments, one or more of the different components of system 100 may be implemented via a single computing device, may be implemented as a distributed network system, and/or may be implemented as a distributed computing system. In some embodiments, one or more of the different components of system 100 may be implemented via a Platform as a Service (PaaS) system.

User device 102 may be any computing device or system controlled by an end user and configured to accept input from an end user, and in some embodiments configured to display feedback to an end user. In some embodiments, user device 102 may be any suitable computing device, including but not limited to a desktop computer, a laptop, a mobile phone, a tablet, a workstation, or the like. In some embodiments, user device 102 may include one or more input devices configured to detect input from a user, including but not limited to a keyboard, mouse, touch-pad, touch-screen, and/or microphone. In some embodiments, user device 102 may include one or more output devices configured to output a signal to a user, including but not limited to a display, speaker, light-emitting device, and/or haptic device. In some embodiments, user device 102 may include one or more network communication devices configured to send and/or receive electronic communications, via wired and/or wireless electronic communication protocols, to one or more other components of system 100 (and in some embodiments to components and/or systems outside system 100).

As shown in FIG. 1, user device 102 may be communicatively coupled to predictive intent system 104 and may be configured to send and receive wired and/or wireless electronic transmissions to/from predictive intent system 104.

In some embodiments, user device 102 may be configured to receive an input from a user in the form of a spoken and/or written utterance, and to responsively transmit data (e.g., via wired and/or wireless network communication) to predictive intent system 104. User device 102 may be further configured to receive transmissions from predictive intent system 104, including but not limited to transmissions responsive to user inputs. In this way, user device 102 may send a query based on one or more user input utterances to predictive intent system 104, and may then receive a response to said query from predictive intent system 104. As explained herein, the response to the user's query may be based on a plurality of algorithms applied to various data structures by predictive intent system 104 and/or by one or more of microservices 106, and the response may include one or more predicted/suggested intents and/or entities based on the user's input utterance(s).

User device 102 may be configured to then display feedback to the user in accordance with the one or more predicted/suggested intents, such as by displaying a list of options for the user to select from. User device 102 may be alternately or additionally be configured to execute, in whole or in part, one or more conversation models or one and/or more technical processes in accordance with the one or more predicted/suggested intents (and/or in accordance with additional input detected from the user). Alternately or additionally, system 100 and/or any other component of system 100 may be configured to in whole or in part, one or more conversation models or one and/or more technical processes in accordance with the one or more predicted/suggested intents (and/or in accordance with additional input detected from the user).

Predictive intent system 104 may be any computing device or system configured to receive inputs/queries from user device 102, to query one or more microservices 106, to receive response payloads from the one or more microservices 106, and to transmit a response to the user input to user device 102. As shown in FIG. 1, predictive intent system 104 may be communicatively coupled to user device 102 and to microservices 106 and may be configured to send and receive wired and/or wireless electronic transmissions to/from any one or more of said components.

In some embodiments, predictive intent system 104 may be configured to receive data (e.g., via wired and/or wireless network communication) from user device 102 representing an input/query utterance (or utterances) from a user, and to responsively transmit data to one or more microservices 106. By transmitting data to one or more of the microservices 106, predictive intent system 104 may call the one or more microservices 106 to execute one or more algorithms or other analyses to parse, interpret, or otherwise process the input data in order to understand the user's utterances and to predict one or more intents and/or entities in accordance with the input utterances. Predictive intent system 104 may further be configured to receive a responsive transmission from the one or more microservices 106, wherein the responsive transmissions may include a payload including a ranked list of entities and/or intents potentially matching or otherwise corresponding to the inputted utterance(s).

As discussed further below, predictive intent system 104 may in some embodiments, further be configured to make a determination (e.g., based on the inputted utterance(s) or on other contextual information) as to which microservices 106 should or should not be called.

As discussed further below, predictive intent system 104 may in some embodiments, further be configured to apply one or more algorithms or other decision-making processes, including machine-learning algorithms, to the payload data received from the one or more microservices 106. For example, as discussed further below, predictive intent system 104 may be configured to apply a holistic ranking analysis to the collective set of suggested intents/entities returned from various different microservices 106, in order to generate a refined set of one or more suggested intents/entities to transmit to user device 102 and/or to use as the basis for causing system 100 to execute one or more conversation models or technical processes.

Language processing microservices 106 may be a set of one or more language processing microservices configured to be called by predictive intent system 104, to execute one or more language processing algorithms, and to return payloads to predictive intent system 104 in accordance with the outcomes of the executed language processing algorithms. Each of microservices 106 may be implemented as any suitable computing device or system. In the example of FIG. 1, seven microservices 106 are shown; however, in some embodiments, system 100 may include more than seven microservices 106 or fewer than seven microservices 106. In some embodiments, system 100 may be configurable to dynamically add and/or remove microservices 106 from system 100.

As shown in FIG. 1, microservices 106 may be communicatively coupled to predictive intent system 104 and to conversation modeling system 108 and may be configured to send and receive wired and/or wireless electronic transmissions to/from any one or more of said components.

As explained further herein, each one of language processing microservices 106 may be configured to receive query data from predictive intent system 104 based on the user's input utterances, and to responsively execute one or more algorithms to analyze the query data. In particular, as explained further herein with respect to the exemplary microservices discussed below with respect to FIGS. 2-7, each of the microservices 106 may be configured to compare the query data using, one or more algorithms, to a database or other corpus of data regarding potential entities and/or intents that may be intended by the user's input utterances. Each of the microservices 106 may then be configured to generate a confidence score for one or more of the entities and/or intents in the respective database/corpus, and to generate a respective rated and ranked list of suggested entities and/or intents based on the application of the respective algorithm to the query data. The generated list may then be transmitted, as part of a respective response payload, back to predictive intent system 104 for further analysis, presentation to the user, and/or responsive execution of one or more processes.

In some embodiments, one or more of the microservices of system 100 may be managed by Azure Kubernetes Service (AKS) on Microsoft's Azure in the Platform as a Service (PaaS) model. The microservices may be coded using node.js frameworks (typescript). The request and response payloads may be formatted in JSON.

In some embodiments, microservices 106 may in some embodiments include an utterance lookup microservice 200, an entity lookup microservice 300, a well-known utterance microservice 400, a reading comprehension microservice 500, an enterprise insights and profiling microservice 600, an intent detection microservice 700a, and/or an entity extraction microservice 700b. These seven microservices are discussed below in more detail with respect to FIGS. 2-7. In some embodiments, microservices 106 may include multiple instances of a single microservice and/or may include additional microservices not listed above.

Returning to FIG. 1, conversation modeling system 108 may be any computing device or system configured to receive inputs from user defining conversation models and to transmit information (e.g., via wired or wireless network communication) to the one or more microservices 106 regarding the defined conversation models. As shown in FIG. 1, conversation modeling system 108 may be communicatively coupled to microservices 106 and may be configured to send and receive wired and/or wireless electronic transmissions to/from any one or more of said microservices 106.

In some embodiments, conversation modeling system 108 may be configured to receive user input (whether from the same user associated with device 102 and/or from one or more different users) defining a conversation model. In some embodiments, a conversation may refer to an interaction (e.g., the entirety of an interaction) between an end user and a core platform/system. A conversation may begin when an end user speaks or types an utterance, and may progress through the conversation as defined by a conversation model such that the platform/system may provide the user with one or more responses and/or may undertake one or more actions (e.g., technical processes) in accordance with the conversation. Conversations are finite and may be short-lived, lasting in some embodiments only long enough to gather the information from the end-user that is needed to complete the request and/or intent of the end-user. In some embodiments, a conversation may last less than a few seconds with an engaged end user. A conversation may be considered complete when the conversation execution has completed (e.g., reached a termination point of a corresponding conversation model) and/or a conversation history is written to storage. A conversation may in some embodiments be identified by an identifier (e.g., a UUID) that is represented in a conversation history and can be tracked in one or more logs.

In some embodiments, conversation modeling system 108 may comprise one or more input devices configured to receive user input for defining a conversation model, and/or may include one or more communication devices configured to receive transmissions of data for defining a conversation model. In some embodiments, conversation modeling system 108 may be configured to generate, render, and/or display one or more user interfaces (e.g., graphical user interfaces) through which a user may define a conversation model, and may further be configured to transmit information regarding conversation models defined in the graphical user interface to the one or more microservices 106.

In some embodiments, conversation models defined by conversation modeling system 108 may be used by system 100 to create, store, and/or configure information/data associated with one or more of the microservices 106. For example, a conversation model may be used to define one or more entities, intents, and/or relationships stored in or associated with a database or other data structure that is searched/queried/analyzed by one of the microservices 106 in response to receipt of data representing a user utterance(s).

Exemplary Microservices and Microservice Methods

FIGS. 2-7 depict various exemplary language processing microservices 106 configured to operate as part of a system for language processing 100. As shown in FIGS. 2-7, each of the microservices may have a similar overall system architecture, in that each one of the microservices may be configured to receive query input data from the predictive intent system 104, use an algorithm to compare the query input data against an index/database/corpus (or multiple such indexes/databases/corpuses), apply a rating and ranking analysis to generate a ranked and rated list of suggested entities/intents from the index/database/corpus, and prepare a payload including the ranked list (including associated confidence scores for each included entity/intent in the list) for transmission back to the predictive intent system 104. Furthermore, for each microservice, the respective index/database/corpus may be created, populated, generated, updated, or otherwise configured by one or more reference information source components including but not limited to a conversation modeling system (e.g., conversation modeling system 108), source systems, and/or an events feed. Different aspects of the various algorithms and reference information source components are discussed below with respect to the various exemplary microservices 106 shown in FIGS. 2-7.

Figure 2:
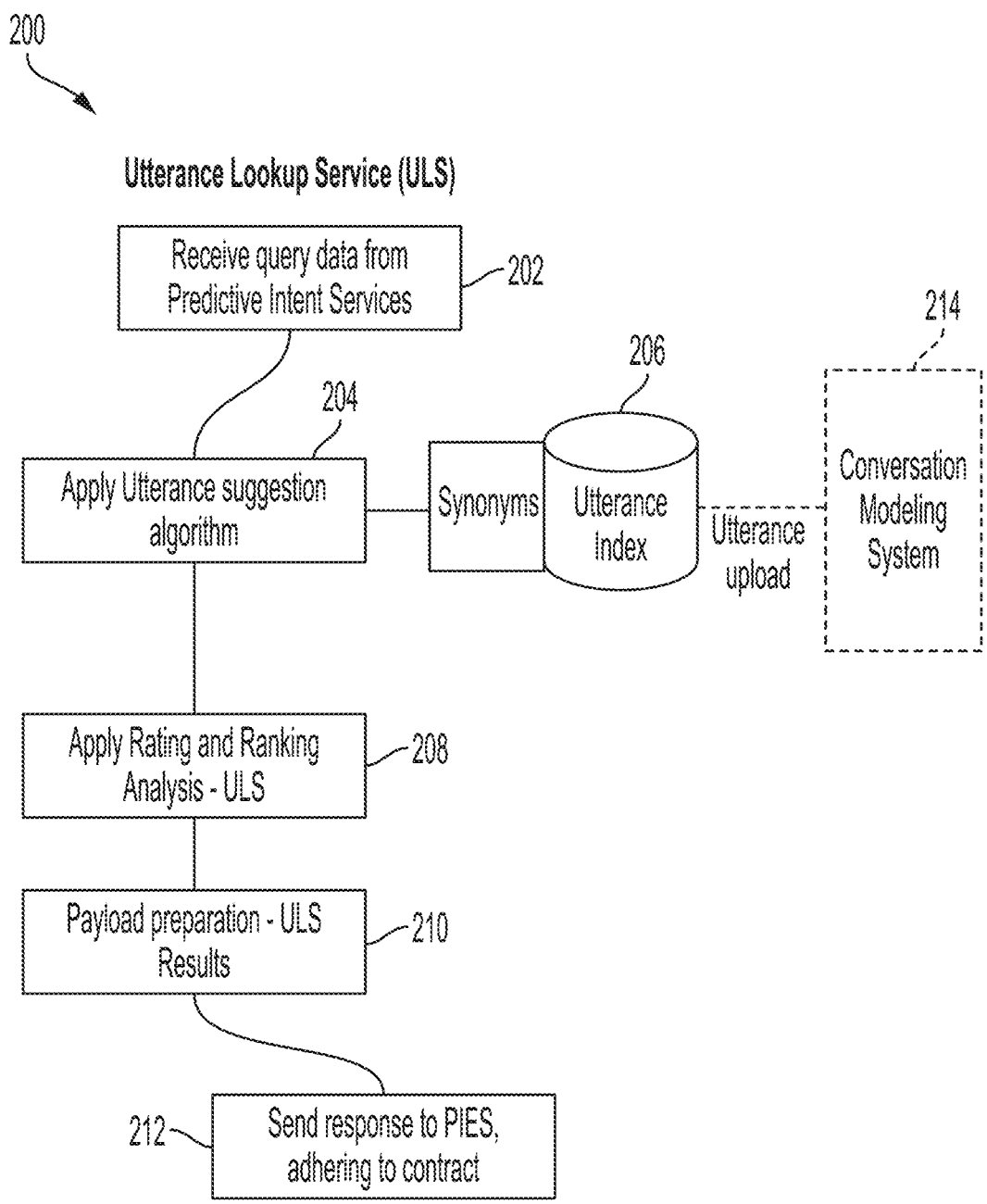
FIG. 2 depicts an utterance lookup microservice configured to operate as part of a system for language processing, in accordance with some embodiments.

FIG. 2 depicts components and operations of utterance lookup microservice 200, in accordance with some embodiments. As shown herein and explained below, utterance lookup microservice 200 may be configured to apply an utterance suggestion algorithm to compare input data from predictive intent service 102 against a plurality of utterances stored in an utterance index, to apply a rating and ranking analysis to selected utterances from the utterance index, and to generate a payload comprising a ranked list of suggested utterances to be transmitted back to predictive intent service 102.

As shown at block 202, utterance lookup service 200 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 204, utterance lookup service 200 may, responsive to receiving the query data from predictive intent service 102, apply an utterance suggestion algorithm to compare the query data regarding the user's utterance(s) against utterance index 206. The utterance suggestion algorithm may be configured to ascertain a user's intent by evaluating words and/or phrases entered by the user and comparing those words and/or phrases to an index of intents and associated training content. The utterance suggestion algorithm may be configured to search, rank, and score relevant results matching the input query, such that the score and/or rank may be leveraged by one or more downstream systems or processes to further enrich one or more other aggregated data sets. The algorithm may also be configured for speed and efficiency to ensure that information is relayed in an expedient manner.

In some embodiments, utterance index 206 may be any suitable corpus of data comprising a plurality of utterances. In some embodiments, utterance index 206 may be provided as a database or as any other suitable data structure. In some embodiments, utterance index 206 may be configured such that it is easily and efficiently searchable by the utterance suggestion algorithm. In some embodiments, utterance index 206 may store one or more utterances in association with one or more synonyms, such that searching for an utterance via synonyms may be enabled.

As shown at block 208, utterance lookup service 200 may apply a rating and ranking analysis to one or more of the utterances stored in utterance index 206. This rating and ranking analysis may be applied in conjunction with, or as a part of, applying the utterance suggestion algorithm discussed above with respect to block 204, such that the rating and ranking analysis is applied with respect to the query data received at block 202. In some embodiments, the rating and ranking analysis may be applied to all utterances stored in utterance index 206, while in some embodiments the rating and ranking analysis may be applied to only a subset of the utterances stored in utterance index 206. In some embodiments, the rating and ranking analysis may be applied to a subset of results extracted from index 206 by the application of the utterance suggestion algorithm discussed with respect to block 204; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective utterances stored in utterance index 206, wherein a confidence score may represent a strength of association (e.g., strength of matching) between a given utterance in the utterance index and the query input data applied by the utterance suggestion algorithm. Application of the rating and ranking analysis may further involve ranking utterances from the utterance index in an order representing which utterances are most preferred as suggested matches or responses for the query data. For example, ranking the utterances may comprise ranking the confidence-scored utterances in order of confidence score from highest (strongest confidence, most preferred) to lowest (weakest confidence, least preferred).

As shown at block 210, utterance lookup service 200 may generate a payload configured to be transmitted to predictive intent service 102. The payload may comprise a ranked list of selected utterances from the utterance index, along with associated respective confidence scores for each entry on the list and any associated metadata for each entry on the list. In some embodiments, metadata included in the list may indicate (a) a confidence score of a list item and (b) a rank position in the list of the list item. In some embodiments, the payload may be formatted in JSON.

In some embodiments, the list may comprise all utterances in the utterance index, while in some embodiments the list may comprise fewer than all utterances in the utterance index. In some embodiments, the list may comprise all utterances returned by the utterance suggestion algorithm, while in some embodiments the list may comprise fewer than all utterances returned by the utterance suggestion algorithm. In some embodiments, the list may comprise all utterances assigned a confidence score by the rating and ranking analysis, while in some embodiments the list may comprise fewer than all utterances assigned a confidence score by the rating and ranking analysis. In some embodiments, the list may comprise a predetermined number of utterances. In some embodiments, the list may comprise a dynamically determined number of utterances, for example a number of utterances determined by application of the utterance suggestion algorithm and/or application of the rating and ranking analysis. In some embodiments, only utterances having confidence scores over a predefined or dynamically determined threshold cutoff may be included in the list.

As shown at block 212, utterance lookup service 200 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

Utterance index 206 may be communicatively coupled to conversation modeling system 214, and may be configured to receive transmissions (e.g., via wired or wireless network communication) from conversation modeling system 214. The transmitted data received from conversation modeling system 214 may comprise information usable by utterance lookup service 200 (e.g., usable by one or more processors associated with utterance lookup service 200) to create, populate, generate, update, or otherwise configure utterance index 206. For example, in some embodiments, a user of conversation modeling system 214 may execute input defining one or more utterances which may be transmitted to utterance index 206 such that they may thereafter be searchable by the utterance suggestion algorithm. In some embodiments, a user of conversation modeling system 214 may define one or more utterances as part of a conversation model that is uploaded to utterance lookup service 200. In some embodiments, conversation modeling system 214 may be the same conversation modeling system used by one or more other microservices of system 100 (including those other microservices discussed herein) or may be a separate conversation modeling system. In some embodiments, information regarding utterances to be stored in utterance index 206 may be uploaded from one or more reference information sources aside from conversation modeling system 214.

Figure 3:
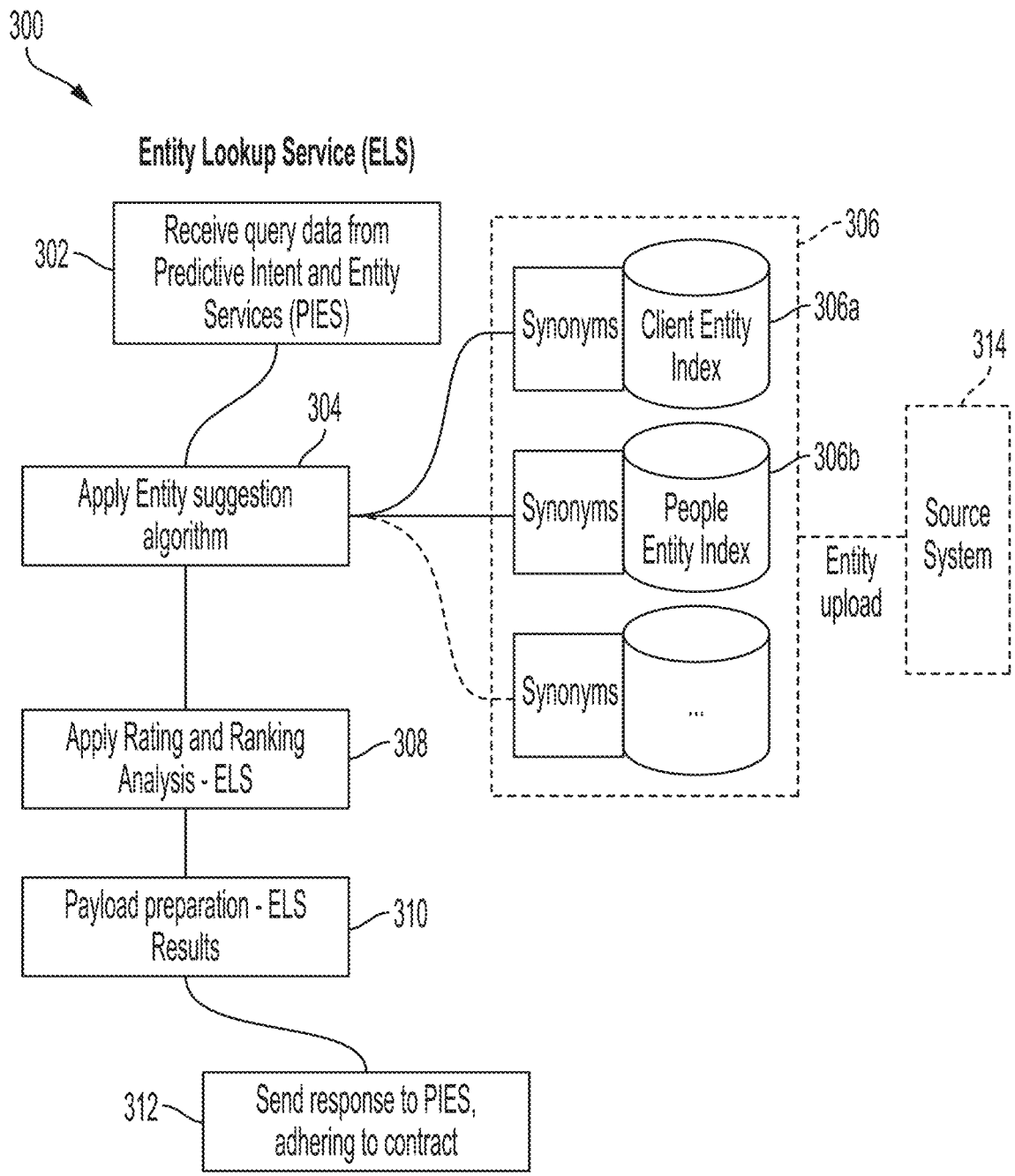
FIG. 3 depicts an entity lookup microservice configured to operate as part of a system for language processing, in accordance with some embodiments.

FIG. 3 depicts components and operations of entity lookup service 300, in accordance with some embodiments. As shown herein and explained below, entity lookup service 300 may be configured to apply an entity suggestion algorithm to compare input data from predictive intent service 102 against a plurality of entities stored in one of one or more entity indexes, to apply a rating and ranking analysis to selected entities from one of the one or more entity indexes, and to generate a payload comprising a ranked list of suggested entities to be transmitted back to predictive intent service 102.

As shown at block 302, entity lookup service 300 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 304, entity lookup service 300 may, responsive to receiving the query data from predictive intent service 102, apply an entity suggestion algorithm to compare the query data regarding the user's utterance(s) against one or more entity indexes 306. The entity suggestion algorithm may be configured to search across one or more entity indexes in order to ascertain the most appropriate entity value(s) and/or entity type(s) based on words or phrases entered by the user. The entity suggestion algorithm may be configured to aggregate results and groups according to entity type. In some embodiments, the entity suggestion algorithm may be configured to recognize one or more synonyms for an entity and to provide additional corresponding entity data such as an entity identifier (e.g., UUID) that may be used downstream by one or more processes or systems to query, categorize, or identify the entity. In some embodiments, results provided by the entity suggestion algorithm may be ranked and scored based on the query's relevance to the content stored in the one or more indexes searched by the entity suggestion algorithm. In some embodiments, the entity suggestion algorithm may be optimized for speed and/or efficiency to ensure that its results may be used by one or more downstream systems and/or processes with minimal impact to overall application response time.

In some embodiments, any one or more of entity indexes 306 may be any suitable corpus of data comprising a plurality of entities. In some embodiments, any one or more of entity indexes 306 may be provided as a database or as any other suitable data structure. In some embodiments, any one or more of entity indexes 306 may be configured such that they are easily and efficiently searchable by the entity suggestion algorithm. In some embodiments, any one or more of entity indexes 306 may store one or more entities in association with one or more synonyms, such that searching for an entity via synonyms may be enabled.

In some embodiments, the one or more entity indexes 306 may include a client entity index 306a that includes entries representing various clients of a person or organization; in some embodiments, the one or more entity indexes 306 may include a people entity index 306b that includes entries representing various people; in some embodiments, the one or more entity indexes 306 may include one or more entity indexes that include entries representing any category of entities, such as organizations, companies, corporations, firms, non-profit organizations, practice groups, teams, people, government organizations, and the like. In some embodiments, entity lookup service 300 may be configured to call all of entity indexes 306, to selectively call only a subset of entity indexes 306 (e.g., in accordance with user instruction or in accordance with an automatic determination as to which indexes to call), and/or to call different ones of entity indexes 306 in a different manner (e.g., by applying the entity suggestion algorithm differently or by applying different parts of the query data to different indexes).

As shown at block 308, entity lookup service 300 may apply a rating and ranking analysis to one or more of the entities stored in any one or more of entity indexes 306. This rating and ranking analysis may be applied in conjunction with, or as a part of, applying the entity suggestion algorithm discussed above with respect to block 304, such that the rating and ranking analysis is applied with respect to the query data received at block 302. In some embodiments, the rating and ranking analysis may be applied to all utterances stored in any one or more of entity indexes 306, while in some embodiments the rating and ranking analysis may be applied to only a subset of the entities stored in any one or more of entity indexes 306. In some embodiments, the rating and ranking analysis may be applied to a subset of results extracted from indexes 306 by the application of the entity suggestion algorithm discussed with respect to block 304; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective entities stored in any one or more of entity indexes 306, wherein a confidence score may represent a strength of association (e.g., strength of matching) between a given entity and the query input data applied by the entity suggestion algorithm. Application of the rating and ranking analysis may further involve ranking entities from any one or more of the entity indexes in an order representing which entities are most preferred as suggested matches or responses for the query data. For example, ranking the entities may comprise ranking the confidence-scored entities in order of confidence score from highest (strongest confidence, most preferred) to lowest (weakest confidence, least preferred).

As shown at block 310, entity lookup service 300 may generate a payload configured to be transmitted to predictive intent service 102. The payload may comprise a ranked list of selected entities from one or more of the entity indexes, along with associated respective confidence scores for each entry on the list. In some embodiments, metadata included in the list may indicate (a) a confidence score of a list item and (b) a rank position in the list of the list item. In some embodiments, metadata included in the list may further indicate a unique entity identifier, such as a client identifier from an enterprise software system such as Salesforce. In some embodiments, the payload may be formatted in JSON.

In some embodiments, the list may comprise all entities in one or more of the entity indexes, while in some embodiments the list may comprise fewer than all entities in one or more of the entity indexes. In some embodiments, the list may comprise all entities returned by the entity suggestion algorithm, while in some embodiments the list may comprise fewer than all entities returned by the entity suggestion algorithm. In some embodiments, the list may comprise all entities assigned a confidence score by the rating and ranking analysis, while in some embodiments the list may comprise fewer than all entities assigned a confidence score by the rating and ranking analysis. In some embodiments, the list may comprise a predetermined number of entities. In some embodiments, the list may comprise a dynamically determined number of entities, for example a number of entities determined by application of the entity suggestion algorithm and/or application of the rating and ranking analysis. In some embodiments, only entities having confidence scores over a predefined or dynamically determined threshold cutoff may be included in the list.

As shown at block 312, entity lookup service 300 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

One or more of entity indexes 306 may be communicatively coupled to source systems 314, and may be configured to receive transmissions (e.g., via wired or wireless network communication) from source systems 314. The transmitted data received from conversation modeling system 314 may comprise information usable by entity lookup service 300 (e.g., usable by one or more processors associated with entity lookup service 300) to create, populate, generate, update, or otherwise configure one or more of entity indexes 306. In some embodiments, a custom built source systems entity upload system manages the transfer of user-agnostic data elements from source systems to populate the entity indexes 306. The source systems entity upload system may receive source system data from API push/pull requests, including real-time API push/pull requests and/or scheduled batch API push/pull requests, or by subscribing to appropriate entity event streaming service topics. In some embodiments, information regarding entities to be stored in one or more of entity indexes 306 may be uploaded from one or more reference information sources aside from source systems 314.

Figure 4:
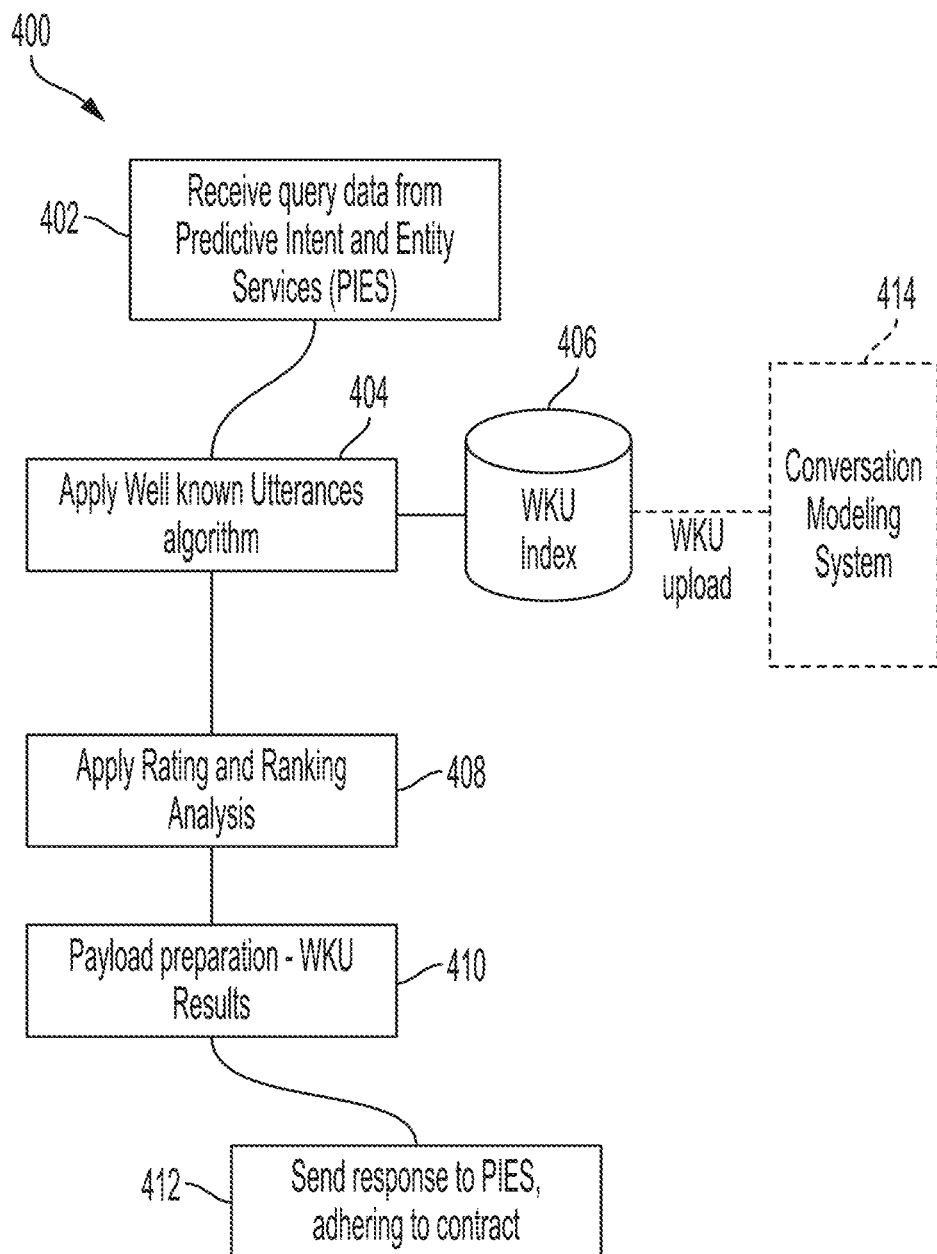
FIG. 4 depicts a well-known utterance microservice configured to operate as part of a system for language processing, in accordance with some embodiments.

FIG. 4 depicts components and operations of well-known utterance service 400, in accordance with some embodiments. As shown herein and explained below, well-known utterance service 400 may be configured to apply a well-known utterance algorithm to compare input data from predictive intent service 102 against a plurality of well-known utterances stored in a well-known utterance index, to apply a rating and ranking analysis to selected well-known utterances from the well-known utterance index, and to generate a payload comprising a ranked list of suggested well-known utterances to be transmitted back to predictive intent service 102.

As shown at block 402, well-known utterance service 400 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 404, well-known utterance service 400 may, responsive to receiving the query data from predictive intent service 102, apply a well-known utterance algorithm to compare the query data regarding the user's utterance(s) against well-known utterance index 406. The well-known utterance algorithm may be configured to evaluate a query entered by a user to ascertain whether or not a trigger phrase or trigger word from a predefined set of trigger phrases and trigger words has been provided and, if so, to return an associated intent and/or one or more associated entities associated with the well-known utterance. The well-known utterance algorithm may in some embodiments be configured to identify short words/phrases and/or abbreviated words/phrases that are in a corpus of well-known utterances. In some embodiments, a well-known utterance algorithm may thus "shortcut" one or more intent-identification processes (including other processes described herein) by executing quick and efficient matching that performs comparisons (e.g., text-to-text comparisons) between an input query and an index of predefined phrases and corresponding intents/entities. In some embodiments, a well-known utterance algorithm may also (additionally or alternatively) perform entity analysis and extract one or more identifiable entities from the input query to return the one or more identified entities (optionally along with one or more identified intents).

In some embodiments, a well-known utterance service such as service 400 may differ from an utterance lookup service such as system 200 in the utterance lookup service may use a more traditional full-text search, whereas a well-known utterance service may utilize a string comparison to evaluate input. Furthermore, corpuses/indexes for the two kinds of services may be loaded differently, and the two services may have separate and independent sources. In some embodiments, an utterance lookup service may receive content from an originating intent definition and training content, whereas a well-known utterance service may receive content from a business analyst and/or conversation modeler who is familiar with the vernacular and common terms of an enterprise.

In some embodiments, well-known utterance index 406 may be any suitable corpus of data comprising a plurality of well-known utterances. In some embodiments, a well-known utterance may be any utterance designated (e.g., by metadata and/or by storage location within an index or database) by a system as "well-known." In some embodiments, maintaining a dedicated corpus of well-known utterances separate from one or more other corpuses of all utterances (including those that are not well-known) may facilitate faster and more efficient lookup and searching based on user's input, such that common and well-known utterances may be found quickly and efficiently in the dedicated corpus without the need to search a much larger and/or exhaustive index of all utterances known to the system.

In some embodiments, well-known utterance index 406 may be provided as a database or as any other suitable data structure. In some embodiments, well-known utterance index 406 may be configured such that it is easily and efficiently searchable by the well-known utterance algorithm. In some embodiments, unlike utterance index 206, well-known utterance index 406 may not be configured to store information regarding synonyms for well-known utterances, as foregoing synonym indexing and searching may maintain high efficiency and reliability for a dedicated well-known utterance index. However, in some embodiments, well-known utterance index 406 may include synonym information in a similar manner as discussed above with respect to utterance index 206.

As shown at block 408, well-known utterance service 400 may apply a rating and ranking analysis to one or more of the well-known utterances stored in well-known utterance index 406. This rating and ranking analysis may be applied in conjunction with, or as a part of, applying the well-known utterance algorithm discussed above with respect to block 404, such that the rating and ranking analysis is applied with respect to the query data received at block 402. In some embodiments, the rating and ranking analysis may be applied to all well-known utterances stored in well-known utterance index 406, while in some embodiments the rating and ranking analysis may be applied to only a subset of the well-known utterances stored in well-known utterance index 406. In some embodiments, the rating and ranking analysis may be applied to a subset of results extracted from index 406 by the application of the well-known utterance algorithm discussed with respect to block 404; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective well-known utterances stored in well-known utterance index 406, wherein a confidence score may represent a strength of association (e.g., strength of matching) between a given well-known utterance in the well-known utterance index and the query input data applied by the well-known utterance algorithm. Application of the rating and ranking analysis may further involve ranking well-known utterances from the well-known utterance index in an order representing which well-known utterances are most preferred as suggested matches or responses for the query data. For example, ranking the well-known utterances may comprise ranking the confidence-scored well-known utterances in order of confidence score from highest (strongest confidence, most preferred) to lowest (weakest confidence, least preferred).

As shown at block 410, well-known utterance service 400 may generate a payload configured to be transmitted to predictive intent service 102. The payload may comprise a ranked list of selected well-known utterances from the well-known utterance index, along with associated respective confidence scores for each entry on the list and any associated metadata for each entry on the list. In some embodiments, metadata included in the list may indicate (a) a confidence score of a list item and (b) a rank position in the list of the list item. In some embodiments, the payload may be formatted in JSON.

In some embodiments, the list may comprise all well-known utterances in the well-known utterance index, while in some embodiments the list may comprise fewer than all well-known utterances in the well-known utterance index. In some embodiments, the list may comprise all well-known utterances returned by the well-known utterance algorithm, while in some embodiments the list may comprise fewer than all well-known utterances returned by the well-known utterance algorithm. In some embodiments, the list may comprise all well-known utterances assigned a confidence score by the rating and ranking analysis, while in some embodiments the list may comprise fewer than all well-known utterances assigned a confidence score by the rating and ranking analysis. In some embodiments, the list may comprise a predetermined number of well-known utterances. In some embodiments, the list may comprise a dynamically determined number of well-known utterances, for example a number of well-known utterances determined by application of the well-known utterance suggestion algorithm and/or application of the rating and ranking analysis. In some embodiments, only well-known utterances having confidence scores over a predefined or dynamically determined threshold cutoff may be included in the list.

As shown at block 412, well-known utterance service 400 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

Well-known utterance index 406 may be communicatively coupled to conversation modeling system 414, and may be configured to receive transmissions (e.g., via wired or wireless network communication) from conversation modeling system 414. The transmitted data received from conversation modeling system 414 may comprise information usable by well-known utterance service 400 (e.g., usable by one or more processors associated with well-known utterance service 400) to create, populate, generate, update, or otherwise configure well-known utterance index 406. For example, in some embodiments, a user of conversation modeling system 414 may execute input defining one or more well-known utterances which may be transmitted to well-known utterance index 406 such that they may thereafter be searchable by the well-known utterance suggestion algorithm. In some embodiments, a user of conversation modeling system 414 may define one or more well-known utterances as part of a conversation model that is uploaded to well-known utterance service 400. In some embodiments, conversation modeling system 414 may be the same conversation modeling system used by one or more other microservices of system 100 (including those other microservices discussed herein) or may be a separate conversation modeling system. In some embodiments, information regarding well-known utterances to be stored in well-known utterance index 406 may be uploaded from one or more reference information sources aside from conversation modeling system 414.

Figure 5:
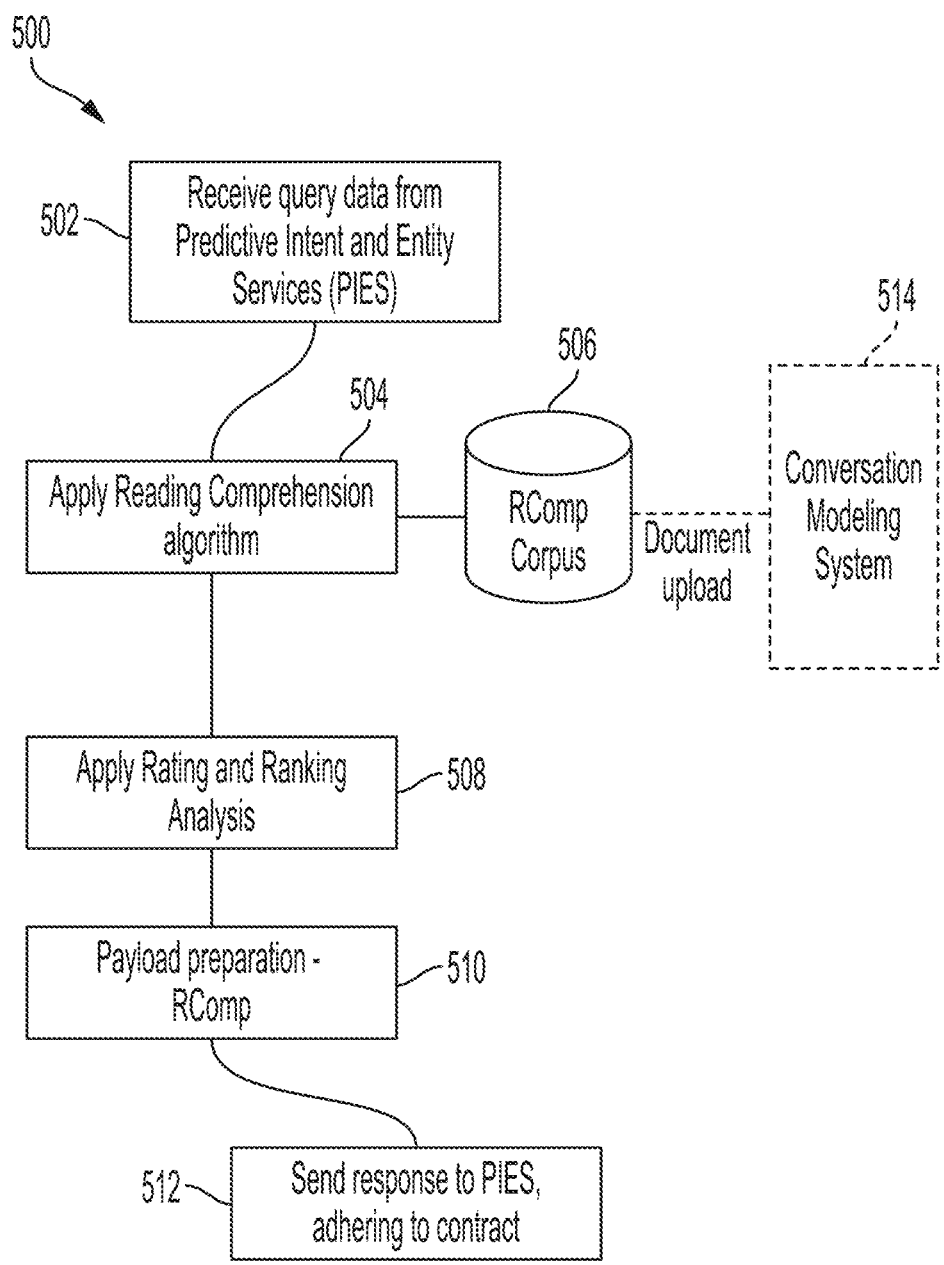
FIG. 5 depicts a reading comprehension microservice configured to operate as part of a system for language processing, in accordance with some embodiments.

FIG. 5 depicts components and operations of reading comprehension service 500, in accordance with some embodiments. As shown herein and explained below, reading comprehension service 500 may be configured to apply a reading comprehension algorithm to compare input data from predictive intent service 102 against a reading comprehension corpus containing information extracted from one or more documents, to apply a rating and ranking analysis to selected information from the reading comprehension corpus, and to generate a payload comprising a ranked list of suggested information from the one or more documents (such as, e.g., snippets of text from the one or more documents) to be transmitted back to predictive intent service 102.

In some embodiments, a reading comprehension microservice may be configured to analyze input query data by comparing it to information gleaned from one or more documents, such as indexed or mapped information that is generated from one or more document formats that may include .PDF, .DOCX, .TXT, .XLSX, or other document formats. In some embodiments, the information gleaned from one or more documents may be used to process user input including but not limited to questions and answers regarding logistics, policies, events, directions, FAQ's, and the like. In some embodiments, a reading comprehension microservice may enable the uploading of structured and/or semi-structured documents containing information to be extracted and leveraged by the system. In some embodiments, document structure may include one or more tags or metadata identifying and structuring information in the document. In some embodiments, data extraction by the reading comprehension service may be performed in accordance with one or more machine-learning algorithms. Documents may include, for example, audit journals, tax journals, human capital processes, or the like. In some embodiments, a reading comprehension service may use one or more algorithms and/or models to train a system implementing the service based on the content of the uploaded documents.

In some embodiments, the information contained in a reading comprehension corpus may be configured to be responsive to questions, such that the service may be geared toward answering users' questions. In some embodiments, a reading comprehension microservice may be configured to return one or more matching results from a corpus using terms and/or a question that is inputted into the service. In some embodiments, a reading comprehension microservice may return results that include a snippet of text that answers an inputted question. In some embodiments, a reading comprehension microservice may return a link to a document from which returned content (e.g., from which a snippet of text) was extracted.

In one example, a Human Capital Employee Handbook document may contain details of Working hours, Sabbatical eligibility, Maternity holidays, Paternity holidays, Maternity pay, etc. A reading comprehension service may extract information from the handbook document. When a user then sends a query asking "What is my paternity holiday allowance", the reading comprehension service may provide a response related to "paternity holidays" in isolation to the rest of the handbook document, rather than simply providing the entire handbook document.

As shown at block 502, reading comprehension service 500 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 504, reading service 500 may, responsive to receiving the query data from predictive intent service 102, apply a reading comprehension algorithm to compare the query data regarding the user's utterance(s) against reading comprehension corpus 506. The well reading comprehension algorithm may be configured to evaluate a query entered by a user to return all or part of information extracted from one or more documents and stored in reading comprehension corpus 506.

In some embodiments, reading comprehension corpus 506 may be any suitable corpus of data comprising information extracted from one or more structured and/or semi-structured documents, as discussed above. In some embodiments, reading comprehension corpus 506 may be provided as a database or as any other suitable data structure. In some embodiments, reading comprehension corpus 506 may be configured such that it is easily and efficiently searchable by the reading comprehension algorithm.

As shown at block 508, reading comprehension service 500 may apply a rating and ranking analysis to one or more of the results (e.g., information extracted from documents) stored in reading comprehension corpus 506. This rating and ranking analysis may be applied in conjunction with, or as a part of, applying the reading comprehension algorithm discussed above with respect to block 504, such that the rating and ranking analysis is applied with respect to the query data received at block 502. In some embodiments, the rating and ranking analysis may be applied to all information stored in reading comprehension corpus 506, while in some embodiments the rating and ranking analysis may be applied to only a subset of the information stored in reading comprehension corpus 506. In some embodiments, the rating and ranking analysis may be applied to a subset of results extracted from corpus 506 by the application of the reading comprehension algorithm discussed with respect to block 504; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective information stored in reading comprehension corpus 506, wherein a confidence score may represent a strength of association (e.g., strength of matching) between a given piece of information stored in the reading comprehension corpus and the query input data applied by the reading comprehension algorithm. Application of the rating and ranking analysis may further involve ranking information from the reading comprehension corpus in an order representing which results are most preferred as suggested matches or responses for the query data. For example, ranking the information/results may comprise ranking the confidence-scored results in order of confidence score from highest (strongest confidence, most preferred) to lowest (weakest confidence, least preferred).

As shown at block 510, reading comprehension service 500 may generate a payload configured to be transmitted to predictive intent service 102. The payload may comprise a ranked list of selected information from the reading comprehension corpus, along with associated respective confidence scores for each entry on the list and any associated metadata for each entry on the list. In some embodiments, metadata included in the list may indicate (a) a confidence score of a list item and (b) a rank position in the list of the list item. In some embodiments, the payload may be formatted in JSON.

In some embodiments, the list may comprise all information in the reading comprehension corpus, while in some embodiments the list may comprise less than all information in the reading comprehension corpus. In some embodiments, the list may comprise all results (e.g., all pieces of information) returned by the reading comprehension algorithm, while in some embodiments the list may comprise fewer than all results returned by the reading comprehension algorithm. In some embodiments, the list may comprise all results assigned a confidence score by the rating and ranking analysis, while in some embodiments the list may comprise fewer than all results assigned a confidence score by the rating and ranking analysis. In some embodiments, the list may comprise a predetermined number of results. In some embodiments, the list may comprise a dynamically determined number of results, for example a number of results determined by application of the reading comprehension algorithm and/or application of the rating and ranking analysis. In some embodiments, only results having confidence scores over a predefined or dynamically determined threshold cutoff may be included in the list.

As shown at block 512, well-known utterance service 500 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

Reading comprehension 606 may be communicatively coupled to conversation modeling system 514, and may be configured to receive transmissions (e.g., via wired or wireless network communication) from conversation modeling system 514. The transmitted data received from conversation modeling system 514 may comprise information usable by reading comprehension service 500 (e.g., usable by one or more processors associated with reading comprehension service 500) to create, populate, generate, update, or otherwise configure reading comprehension corpus 506. For example, in some embodiments, a user of conversation modeling system 514 may execute input defining one or more pieces of information (and/or processed for extracting information) that may be transmitted to reading comprehension corpus 506 such that those pieces of information (and/or information extracted in accordance with said processes) may thereafter be searchable by the reading comprehension algorithm. In some embodiments, a user of conversation modeling system 514 may define one or more pieces of information for storage in reading comprehension corpus (or may define one or more processes for extracting said information) as part of a conversation model that is uploaded to reading comprehension service 500. In some embodiments, conversation modeling system 514 may be the same conversation modeling system used by one or more other microservices of system 100 (including those other microservices discussed herein) or may be a separate conversation modeling system. In some embodiments, information to be stored in reading comprehension corpus 606 may be uploaded from one or more reference information sources (e.g., document sources) aside from conversation modeling system 514.

Figure 6:
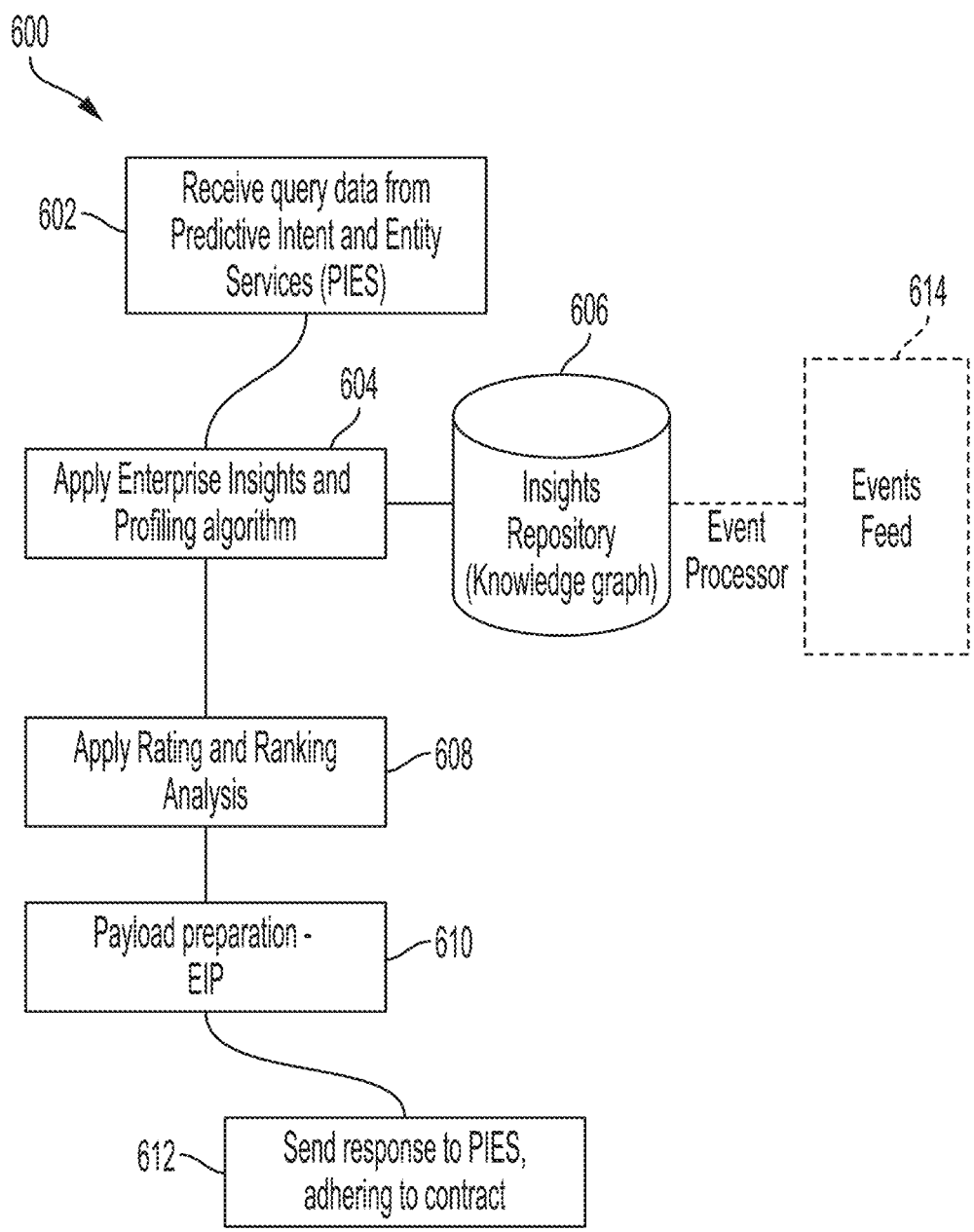
FIG. 6 depicts an enterprise insights and profiling microservice configured to operate as part of a system for language processing, in accordance with some embodiments.

FIG. 6 depicts components and operations of enterprise insights and profiling (EIP) service 600, in accordance with some embodiments. As shown herein and explained below, enterprise insights and profiling microservice 600 may be configured to apply an EIP algorithm to compare input data from predictive intent service 102 against a plurality of utterances and/or entities stored in an insights repository, to apply a rating and ranking analysis to selected utterances and/or entities from the insights repository, and to generate a payload comprising a ranked list of suggested utterances and/or entities to be transmitted back to predictive intent service 102.

In some embodiments, an EIP microservice may be configured to perform ad-hoc queries relating to personalized/related information, such as by returning data such as: utterance history, entity usage history, relationships to entities (person, clients, etc.). In some embodiments, providing personalized/related information in response to queries may aid in allowing the system to provide personal predictive results.

As explained herein, EIP service 600 may be configured to process query data from predictive intent service 102 and to responsively return a payload of suggested utterances and/or entities in a similar manner as other microservices discussed herein; however, EIP service 600 may differ from other microservices discussed herein at least due to the manner in which the insights repository is created, configured, and maintained. As discussed in further detail below, insights repository 606 may in some embodiments be a more complex data structure than other indexes or corpuses searched by other microservices discussed herein; for example, insights repository 606 may in some embodiments comprise a knowledge graph, relationship graph, or other data structure representing one or more relationships between various entities and/or utterances, including by representing the strengths of those relationships. In some embodiments, insights repository 606 may represent information gleaned from historical conversations of users; current trends of conversations within enterprise systems; current trends in a firm, industry, sector; global and political trends; and/or information about a user such as the user's skillset, location, compliance details, interests, preferences, etc.

In some embodiments, a relationship graph of insights repository 606 may store user-specific data (e.g., utterances and entities used historically by the user) and/or user attributes (e.g., employee information, location, email, department, line of service, engagements, projects, etc.). In some embodiments, a relationship graph of insights repository 606 may store data in one or more data structures comprising nodes, edges, and properties. Graph structures of such a graph may be populated from system usage (e.g., in real time), system of record (SOR) feeds (in batch and/or in real time), and/or system trends (e.g., in batch).

In some embodiments, cached data may be accessible via EIP service 600 (and/or via one or more other system components of any system described herein). Cached data may comprise user-specified data that resides in a cache structure and may comprise data that does not change often, including for example email data for a person, ID data for a person or organization, profile information for a person or organization, recent activity information for a person or organization, etc. In some embodiments, cached data may be stored in JSON format and may be populated and/or updated in real-time and/or as part of one or more batch processes from platform events. In some embodiments, cached data may be stored separately from predictive intent system 104. In some embodiments, cached data may be accessed in real time during user sessions, and/or may be accessed in conjunction with one or more service calls. In some embodiments, cached data may be used as keys or data points to pass to other microservices within the system and/or outside of the system.

In some embodiments, indexed data may be accessible via EIP service 600 (and/or via one or more other system components of any system described herein). Indexed data may comprise one or more collections of indexed data that may be stored in JSON format. Indexed data may be user-agnostic and may comprise one or more lists of entities represented as the same type of value that may be of interest to multiple users, such as utterance data, client data, people data, or the like. In some embodiments, indexed data may be stored as part of insights repository 606. Indexed data may be configured to be searched directly upon, and/or to be searched in combination with the one or more other data sources within insights repository 606. Indexed data may be configured to be evaluated and/or scored against other matches from one or more other data sources, such as graphs, databases, other indexes, or the like.

In some embodiments, system of record (SOR) data may be accessible via EIP service 600 (and/or via one or more other system components of any system described herein). SOR data may in some embodiments be used to populate, configure, and/or update one or more graph structures or other data structures of insights repository 606.

In some embodiments, one or more APIs may return SOR data, for example in real-time, such as an entity value from a user. SOR data may be retrieved in JSON format populated by any suitable system of SOR API process from an API call passing proper security and data elements (e.g., tokens, API secret/keys, query values, etc.).

The EIP algorithm configured to query the insights repository may thus return insightful information, such as information gleaned from the data sources and data structures discussed above, which may not be available from other microservices discussed herein.

As shown at block 602, EIP service 600 may receive query data from predictive intent service 102. The query data may be received from predictive intent service 102 via any suitable wired or wireless electronic communication protocol, and the query data may comprise information about one or more utterances included in a user input received by predictive intent service 102.

As shown at block 604, EIP service 600 may, responsive to receiving the query data from predictive intent service 102, apply an EIP algorithm to compare the query data regarding the user's utterance(s) against insights repository 606.

In some embodiments, insights repository 606 may be provided as a database or as any other suitable data structure. As stated above, insights repository 606 may be a corpus of data (e.g., an index, database, data store, etc.) storing information regarding a plurality of utterances and/or entities. Furthermore, insights repository may store information regarding relationships amongst the various utterances and/or entities represented in the repository. Information about relationships may be stored regarding entity-entity pairs, entity-utterance pairs, and utterance-utterance pairs. In some embodiments, information in the insights repository may be stored as a knowledge graph and/or relationship graph.

In some embodiments, information about relationships between entities and/or utterances may be represented by a relationship score indicating a strength of the relationship. For example, a relationship score may in some embodiments be a number between 0 and 1, where 0 represents the weakest possible relationship (e.g., no relation) and 1 represents the strongest possible relationship. In some embodiments, relationship scores may be determined by information received at the insights repository from an events feed (e.g., events feed 614), as discussed in further detail below. Information received by the insights repository regarding entities and/or utterances (e.g., information received from an events feed) may be used to create new relationships, delete existing relationships, and/or update/modify existing relationships (such as by adjusting a relationship score).

In some embodiments, insights repository 606 may be configured such that relationships represented therein age over time. For example, relationship scores may be configured to decay (e.g., weaken) over time, for example in accordance with a predefined decay algorithm (e.g., linear decay, logarithmic decay, decay according to a predefined schedule, decay in accordance with one or more triggering events, etc.). In some embodiments, certain relationships may be designated in insights repository 606 as aging relationships such that their relationship score decays over time, while other relationships may be designated in insights repository 606 as non-aging relationships such that their relationship score does not decay over time.

In some embodiments, insights repository 606 may be configured such that it is easily and efficiently searchable by the EIP algorithm. In some embodiments, insights repository 606 may store one or more utterances and/or entities in association with one or more synonyms, such that searching for an utterance via synonyms may be enabled. In some embodiments, an EIP microservice may be configured to receive internal and/or external events from various channels such as enterprise systems, collaboration tools, and/or other enterprise knowledge bases. The EIP service may then utilize a relationship analyzer and/or an event processor to process the received events into insights repository 606. In some embodiments, an EIP service may also provide the ability to query insights repository 606 via real time queries and/or by scheduled processes (e.g., business-rule processes). In some embodiments, an EIP service may provide the ability to establish insightful relationships, as represented in insights repository 606, among enterprise entities and intents, for the purpose of proactively and reactively providing the most efficient and relevant content for enterprise users.

In some embodiments, an EIP service may use a number of data sources to enrich the experience for users, and may detect relevant intents and/or entities based on, for example: historical conversations of users; current trends of conversations within enterprise systems; current trends in a firm; industry, sector, world and/or political trends; and/or information from an insights repository and/or knowledge graph pertaining to a user, such as skillset, location, compliance details, interests, preferences, etc.

As shown at block 608, EIP service 600 may apply a rating and ranking analysis to one or more of the utterances and/or entities stored in insights repository 606. This rating and ranking analysis may be applied in conjunction with, or as a part of, applying the EIP algorithm discussed above with respect to block 604, such that the rating and ranking analysis is applied with respect to the query data received at block 602. In some embodiments, the rating and ranking analysis may be applied to all utterances and/or entities stored in insights repository 606, while in some embodiments the rating and ranking analysis may be applied to only a subset of the utterances and/or entities stored in insights repository 606. In some embodiments, the rating and ranking analysis may be applied to a subset of results extracted from repository 606 by the application of the EIP algorithm discussed with respect to block 604; for example, the rating and ranking analysis may in some embodiments be applied to a subset of results identified by the algorithm and may further narrow that subset of results into a refined subset to be returned from the microservice.

Application of the rating and ranking analysis may generate confidence scores associated with respective utterances and/or entities stored in insights repository 606, wherein a confidence score may represent a strength of association (e.g., strength of matching) between a given utterance and/or entity in the insights repository 606 and the query input data applied by the EIP algorithm. Application of the rating and ranking analysis may further involve ranking utterances and/or entities from the insights repository 606 in an order representing which utterances and/or are most preferred as suggested matches or responses for the query data. For example, ranking the utterances and/or entities may comprise ranking the confidence-scored utterances and/or entities in order of confidence score from highest (strongest confidence, most preferred) to lowest (weakest confidence, least preferred).

As shown at block 610, EIP service 600 may generate a payload configured to be transmitted to predictive intent service 102. The payload may comprise a ranked list of selected utterances and/or entities from the insights repository, along with associated respective confidence scores for each entry on the list and any associated metadata for each entry on the list. In some embodiments, metadata included in the list may indicate (a) a confidence score of a list item and (b) a rank position in the list of the list item. In some embodiments, the payload may be formatted in JSON.

In some embodiments, the list may comprise all utterances and/or entities in the insights repository, while in some embodiments the list may comprise fewer than all utterances and/or entities in the insights repository. In some embodiments, the list may comprise all utterances and/or entities returned by the EIP algorithm, while in some embodiments the list may comprise fewer than all utterances and/or entities returned by the EIP algorithm. In some embodiments, the list may comprise all utterances and/or entities assigned a confidence score by the rating and ranking analysis, while in some embodiments the list may comprise fewer than all utterances and/or entities assigned a confidence score by the rating and ranking analysis. In some embodiments, the list may comprise a predetermined number of utterances and/or entities. In some embodiments, the list may comprise a dynamically determined number of utterances and/or entities, for example a number of utterances and/or entities determined by application of the EIP algorithm and/or application of the rating and ranking analysis. In some embodiments, only utterances and/or entities having confidence scores over a predefined or dynamically determined threshold cutoff may be included in the list.

As shown at block 612, EIP service 600 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

Insights repository 606 may be communicatively coupled to conversation modeling system 614, and may be configured to receive transmissions (e.g., via wired or wireless network communication) from events feed 614. Events feed 614 may include any one or more systems configured to monitor (e.g., subscribe to) a plurality of sources of information to ingest new information about events as they occur. As explained herein, the ingested information about events may be processed to generate information regarding entities, utterances, and/or relationships related to those events for storage in insights repository 606.

The transmitted data received from events feed 614 may comprise information usable by EIP service 600 (e.g., usable by one or more processors associated with EIP service 600) to create, populate, generate, update, or otherwise configure insights repository 606. For example, in some embodiments, information regarding entities, utterances, and/or relationships may be uploaded to insights repository 606 from events feed 614; in some embodiments, as discussed further herein, an events processor system may process information from events feed 614 in order to generate data to be uploaded to insights repository 606. In some embodiments, information regarding utterances, entities, and/or relationships to be stored in insights repository 606 may be uploaded from one or more reference information sources aside from events feed 614.

Figure 7:
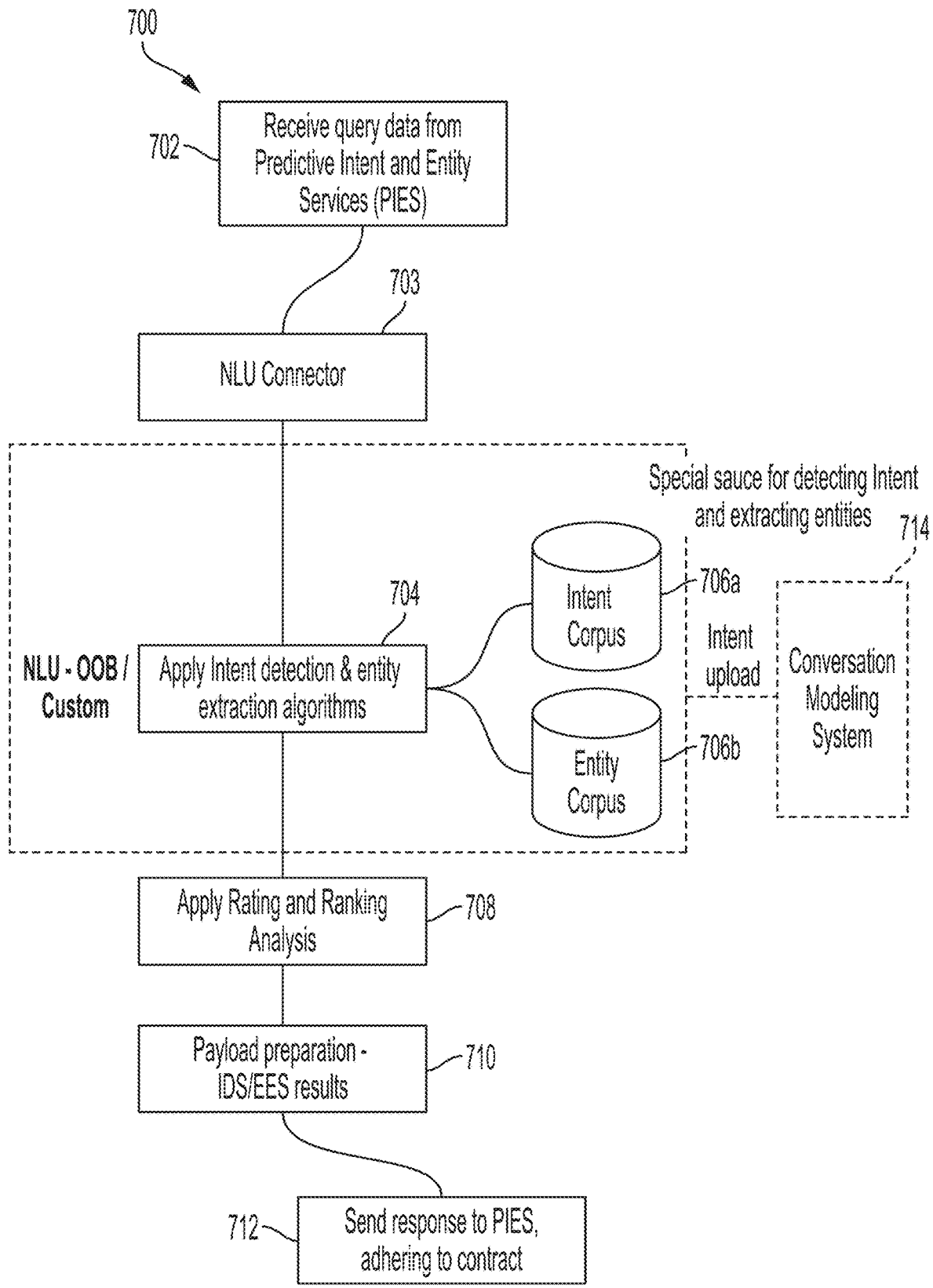
FIG. 7 depicts an intent detection microservice and an entity extraction microservice, each configured to operate as part of a system for language processing, in accordance with some embodiments.

FIG. 7 depicts components and operations of intent detection service 700a (as shown in FIG. 1) and entity extraction service 700b (as shown in FIG. 1), collectively referred to herein as IDS/EES 700, in accordance with some embodiments. As shown herein and explained below, IDS/EES 700 may be configured to apply an intent detection algorithm and an entity extraction suggestion algorithm to compare input data from predictive intent service 102 against a plurality of intents and/or entities stored in one of one or more of an intent understanding corpus and an entity corpus, to apply a rating and ranking analysis to selected entities and/or intents from one of the one or more entity indexes, and to generate a payload comprising a ranked list of suggested entities and/or intents to be transmitted back to predictive intent service 102. In some embodiments, IDS/EES 700 may be utilized by system 100 in situations in which one or more of the other microservices have not been successful in identifying an utterance, intent, and/or entity. By using an NLU connector as discussed below, IDS/EES 700 may allow for system 100 to leverage one or more internal and/or external NLU/NLP services that may be connected to the system without being manually integrated into the system other than through the NLU connector. In some embodiments, IDS/EES 700 may be utilized by system 100 to analyze user input to detect which part of the user input is valuable to extract and pass values to call the utterance lookup service 200 and/or well-known utterance service 400.

As shown at block 702, IDS/EES 700 may receive query data from predictive intent service 102. The query data may be received from predictive intent service 102 via any suitable wired or wireless electronic communication protocol, and the query data may comprise information about one or more utterances included in a user input received by predictive intent service 102. In some embodiments, predictive intent service 102 may be connected to one or more components (e.g., processing components) of IDS/EES 700 by natural language understanding (NLU) connector 703, which may be configured to facilitate network communication (e.g., wired or wireless network communication) between predictive intent service 102 and one or more computing and/or data storage components of IDS/EES 700, such as processors and/or databases.

As shown at block 704, IDS/EES 700 may, responsive to receiving the query data from predictive intent service 102, apply an intent detection algorithm and/or an entity extraction algorithm to compare the query data regarding the user's utterance(s) against one or more of an intent understanding corpus 706a and an entity corpus 706b.

In some embodiments, IDS and EES algorithms may be separate and distinct from one another, but their results may be aggregated as a single output for use by the overall system and/or by other system components. In some embodiments, an IDS algorithm may include a machine learning algorithm or other algorithm for ascertaining a user's intent, and may evaluate an input query for natural language patterns and compare and evaluate incoming query data with reference to the data set within an intent understanding corpus and/or entity corpus to determine a user intent. In some embodiments, an EES algorithm may evaluate an input query to ascertain if there are any identifiable entities based on comparison with an entity corpus. In some embodiments, both an IDS and EES algorithm may rank and score results based on relevant hits/matches within the corpus queried.

In some embodiments, intent understanding corpus 706a may be any suitable corpus of data comprising a plurality of intents, and entity corpus 706b may be any suitable corpus of data comprising a plurality of entities. In some embodiments, one or both of intent understanding corpus 706a and entity corpus 706b may be provided as a database or as any other suitable data structure. In some embodiments, one or both of intent understanding corpus 706a and entity corpus 706b may be configured such that they are easily and efficiently searchable by the intent detection algorithm and/or entity extraction algorithm. In some embodiments, one or both of intent understanding corpus 706a and entity corpus 706b may store one or more information objects in association with one or more synonyms, such that searching for an entity or intent via synonyms may be enabled.

In some embodiments, intent understanding corpus 706a may comprise data including intents themselves as well as training content corresponding to one or more respective intents (e.g., training content that may trigger the intent). In some embodiments, one or more conversation models may be contributors to intent understanding corpus 706a. In some embodiments, intent understanding corpus 706a may be generated and maintained separately from one or more conversation models and/or other components of the systems described herein. Even though segregation between intent understanding corpus 706a and conversation models may exist, intent understanding corpus 706a may and conversation models may be correlated via unique identifiers (e.g., UUIDs) identifying an intent. In some embodiments, once an intent is determined by the system, the system may use a corresponding intent identifier to look up one or more conversation models that may define how to retrieve results in accordance with the determined intent.

In some embodiments, natural language understanding (NLU) connector 703 may provide capability for connecting to multiple NLU solutions and/or natural language processing (NLP) solutions. In some embodiments, various different NLU/NLP solutions (e.g., Google Dialogflow, IBM Watson, Microsoft LUIS, etc.) may be configured to process requests that are in a specified format comprising, e.g.: authentication/identifier, request type, request data, etc. Each request format may be specific to a single NLU/NLP solution. NLU connector 703 may be configured to enable the systems described herein to communicate with a plurality of different NLU/NLP solutions using the proper respective formats, thus enabling simultaneous and/or parallelized communication with multiple different NLU/NLP solutions without requiring code-level changes.

In some embodiments, IDS/EES 700 may be configured to search both intent understanding corpus 706a and entity corpus 706b, to selectively search only one or the other (e.g., in accordance with user instruction or in accordance with an automatic determination as to which corpus to search), and/or to the different corpuses in a different manner (e.g., by applying the detection/extraction algorithm(s) of IDS/EES 700 differently or separately, or by applying different parts of the query data to different corpuses).

As shown at block 708, IDS/EES 700 may apply a rating and ranking analysis to one or more of the intents and/or entities stored in any one or more of indexes 706a and 706b. This rating and ranking analysis may be applied in conjunction with, or as a part of, applying the algorithm discussed above with respect to block 704, such that the rating and ranking analysis is applied with respect to the query data received at block 702. In some embodiments, the rating and ranking analysis may be applied to all intents and/or entities stored in any one or more of corpuses 706a and 706b, while in some embodiments the rating and ranking analysis may be applied to only a subset of the intents and/or entities stored in any one or more of indexes 706a and 706b. In some embodiments, the rating and ranking analysis may be applied to a subset of results extracted from indexes 706a and/or 706b by the application of the IDS and EES algorithm(s) discussed with respect to block 704; for example, the rating and ranking analysis may in some embodiments be applied to a subset of results identified by the algorithm(s) and may further narrow that subset of results into a refined subset to be returned from the microservice.

In some embodiments, IDS and EES results may be returned, aggregated, refined, rated, and/or ranked collectively (e.g., with IDS results and EES results in a common results set). In some embodiments, IDS and EES results may be returned, aggregated, refined, rated, and/or ranked separately from one another (e.g., with IDS results and EDS results in segregated results sets from one another).

Application of the rating and ranking analysis may generate confidence scores associated with respective intents and/or entities stored in one or both of the corpuses 706a and 706b, wherein a confidence score may represent a strength of association (e.g., strength of matching) between a given intent or entity and the query input data applied by the algorithm. Application of the rating and ranking analysis may further involve ranking intents and/or entities from one or both of the corpuses in an order representing which intents and/or entities are most preferred as suggested matches or responses for the query data. For example, ranking the intents and/or entities may comprise ranking the confidence-scored entities in order of confidence score from highest (strongest confidence, most preferred) to lowest (weakest confidence, least preferred). In some embodiments, intents from intent understanding corpus 706a may be rated and ranked (e.g., formed into a list) separately from entities from entity corpus 706b; in some embodiments, they may be rated and ranked together (e.g., formed into a single list).

As shown at block 710, IDS/EES 700 may generate a payload configured to be transmitted to predictive intent service 102. The payload may comprise one or more ranked lists of selected entities and/or intents from one or both of the corpuses 706a and 706b, along with associated respective confidence scores for each entry on the list(s) and any associated metadata for each entry on the list(s). In some embodiments, metadata included in the list(s) may indicate (a) a confidence score of a list item and (b) a rank position in the list of the list item. In some embodiments, the payload may be formatted in JSON.

In some embodiments, the list(s) may comprise all entities/intents in one or both of the corpuses, while in some embodiments the list(s) may comprise fewer than all entities/intents in one or both of the corpuses. In some embodiments, the list(s) may comprise all entities/intents returned by the algorithm(s), while in some embodiments the list(s) may comprise fewer than all entities/intents returned by the algorithm(s). In some embodiments, the list(s) may comprise all entities/intents assigned a confidence score by the rating and ranking analysis, while in some embodiments the list(s) may comprise fewer than all entities/intents assigned a confidence score by the rating and ranking analysis. In some embodiments, the list(s) may comprise a predetermined number of entities/intents. In some embodiments, the list(s) may comprise a dynamically determined number of entities/intents, for example a number of entities/intents determined by application of the algorithm(s) and/or application of the rating and ranking analysis. In some embodiments, only entities/intents having confidence scores over a predefined or dynamically determined threshold cutoff may be included in the list(s).

As shown at block 712, IDS/EES 700 may transmit the payload to predictive intent service 102. Transmission of the payload to predictive intent service 102 may be performed responsively to receipt of the query data from predictive intent service 102 and generation of the payload. In some embodiments, transmission of the payload to predictive intent service 102 may be via any suitable wired or wireless electronic communication protocol.

One or both of intent understanding corpus 706a and entity corpus 706b may be communicatively coupled to conversation modeling system 714, and may be configured to receive transmissions (e.g., via wired or wireless network communication) from conversation modeling system 714. The transmitted data received from conversation modeling system 714 may comprise information usable by IDS/EES 700 (e.g., usable by one or more processors associated with IDS/EES 700) to create, populate, generate, update, or otherwise configure one or both of intent understanding corpus 706a and entity corpus 706b. For example, in some embodiments, a user of conversation modeling system 714 may execute input defining one or more intents and/or entities which may be transmitted to one or both of intent understanding corpus 706a and entity corpus 706b such that they may thereafter be searchable by the intent detection algorithm and/or entity extraction algorithm. In some embodiments, a user of conversation modeling system 714 may define one or more entities and/or intents as part of a conversation model that is uploaded to IDS/EES 700. (In some embodiments, conversation models and intents may have a 1:1 relationship, such that a single intent corresponds only to one conversation model.) In some embodiments, conversation modeling system 714 may be the same conversation modeling system used by one or more other microservices of system 100 (including those other microservices discussed herein) or may be a separate conversation modeling system. In some embodiments, information regarding intents and/or entities to be stored in one or both of intent understanding corpus 706a and entity corpus 706b may be uploaded from one or more reference information sources aside from conversation modeling system 714.

Exemplary Methods

Figure 8:
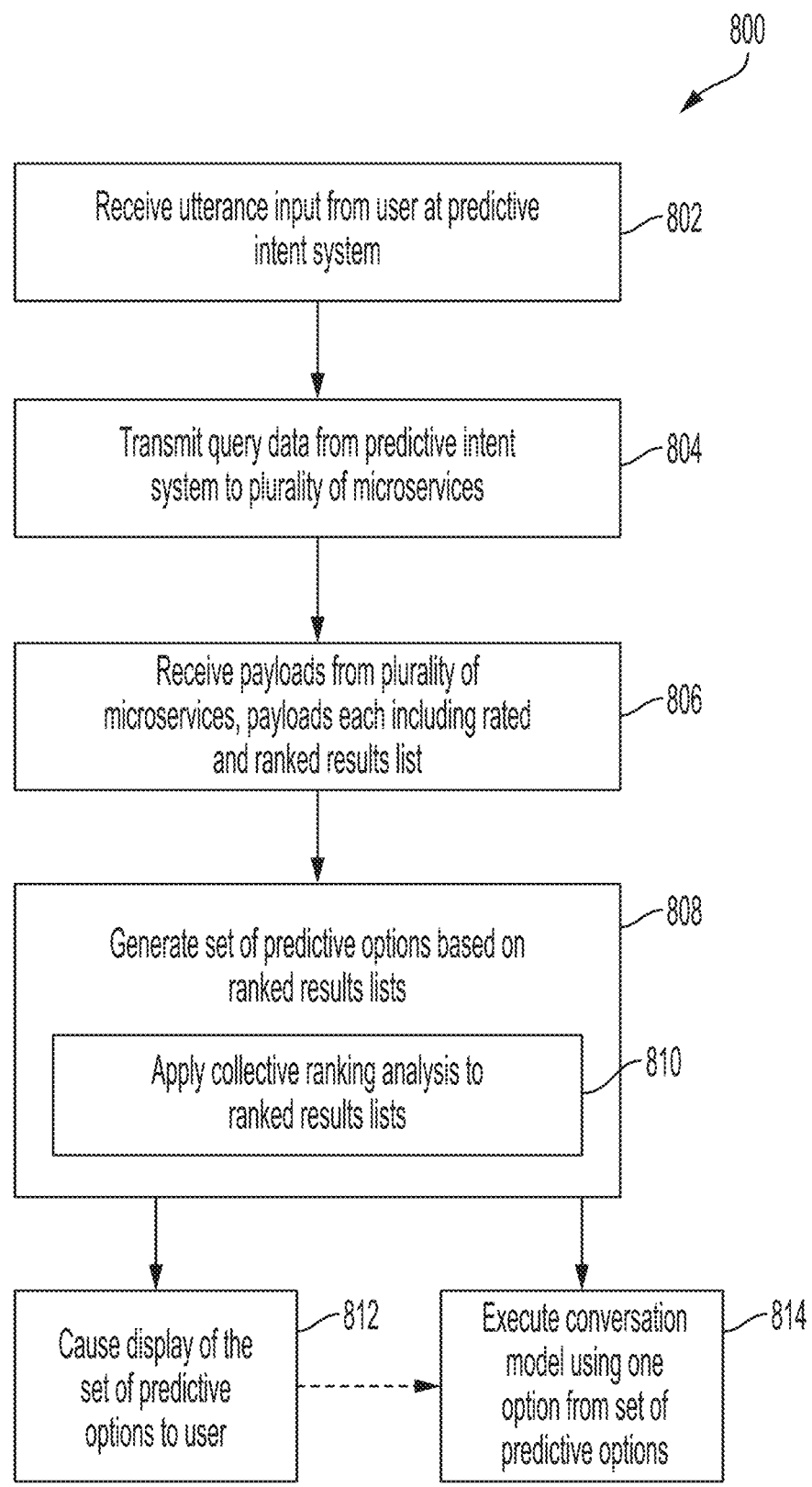
FIG. 8 depicts a flow chart showing an exemplary method 800 for processing an utterance input, in accordance with some embodiments.

FIG. 8 depicts a flow chart showing an exemplary method 800 for processing an utterance input using a plurality of language processing microservices, in accordance with some embodiments. In some embodiments, method 800 may be performed by a system for language processing such as system 100 described above with reference to FIG. 1. In particular, the method steps of method 800 may be performed by a predictive intent system of a language processing system, such as predictive intent system 104 of language processing system 100. Exemplary steps of method 800 are described below.

At block 802, in some embodiments, predictive intent system 104 may receive an utterance input from a user. In some embodiments, the utterance input may be received from a user device such as user device 102 and may be forwarded (e.g., via wired or wireless network communication) to predictive intent system 104. In some embodiments, user device 102 may be configured to receive an input from a user in the form of a spoken and/or written utterance, and to responsively transmit data (e.g., via wired and/or wireless network communication) derived from the user input to predictive intent system 104. In some embodiments, user device 102 may send a query based on one or more user input utterances to predictive intent system 104. In some embodiments, user device 102 may send raw data regarding user input to predictive intent system 104, and predictive intent system 104 may process the data received from user device 102 in order to generate query data to be forwarded to a plurality of microservices.

In the case of written utterances, the system 100 may in some embodiments be configured to analyze the typed utterance after a user explicitly directs the system to (e.g., when the user is done typing); in some embodiments, the system 100 may be configured to analyze the typed utterance(s) in real-time following each keystroke by a user.

At block 804, in some embodiments, predictive intent system 104 may transmit query data to a plurality of microservices. Based on the input data (e.g., raw or processed data representing all or part of a user's utterance) received from user device 102, predictive intent system 104 may generate and transmit query data to a plurality of language processing microservices. The query data may be configured to be supplied, by the plurality of microservices, to searching and rating/ranking algorithms to generate payloads including ranked lists of predicted intents, entities, and/or utterances based on the user's input utterance. In this way, predictive intent system 104 may receive an input user utterance and leverage the plurality of microservices to predict an intent, entity, and/or utterance signified by the user's input utterance.

In some embodiments, the query data to be transmitted to the plurality of microservices may be generated by predictive intent system 104. In some embodiments, the same query data may be transmitted to each of the plurality of microservices; in some embodiments, different query data may be transmitted to different ones of the plurality of microservices.

In some embodiments, predictive intent system 104 may transmit query data to all available microservices; in some embodiments, predictive intent system 104 may transmit query data to a subset of available microservices, based on explicit user input, system settings, and/or the content of the input utterance and query data itself.

After predictive intent system 104 sends query data to the plurality of microservices, each of the recipient microservices may process the query data in order to analyze the user's utterance and generate a ranked list of predictive intents, entities, and/or utterances. In some embodiments, one or more of the microservices may process the query data by (1) applying a respective mapping algorithm to the query data and to a respective index or corpus of the like, wherein the respective index or corpus comprises representations of entities, utterances, and/or intents; (2) applying a respective rating algorithm to generate a ranked list of potential entities, utterances, and/or intents based on the content represented by the respective index or corpus; and (3) generating a respective query response payload, wherein generating the payload comprises selecting, based on the ranked list, a respective subset of the entities, utterances, and/or intents.

In some embodiments, one or more of the microservices may process the query data and generate a payload in accordance with one or more of the characteristics of any one of the embodiments explained above with respect to microservices 200, 300, 400, 500, 600, and 700 explained above with respect to FIGS. 2-7.

At block 806, in some embodiments, predictive intent system 104 may receive respective payloads from the plurality of microservices, each of the payloads including a respective rated and ranked list of results responsive to the query data. In some embodiments, the payloads received from each of the plurality of microservices may each share any one or more of the characteristics of any one of the embodiments explained above with respect to microservices 200, 300, 400, 500, 600, and 700 explained above with respect to FIGS. 2-7.

At block 808, in some embodiments, predictive intent system 104 may generate a set of predictive options based on the rated and ranked lists received in the payloads. That is, predictive intent system 104 may process the aggregated results from each of the microservices in order to generate a set of refined results, wherein the set of refined results is a subset of the aggregated results received collectively from the queried microservices.

In some embodiments, generating the set of refined results may comprise evaluating the results (e.g., utterances, entities, and/or intent) included in the various ranked lists received from the microservices in order to evaluate results returned by one or more microservices, including for example connectivity results, user preference results, and/or autosuggestion search results.

In some embodiments, connectivity results may be a result from a relationship graph, such as data that is returned in response to inputting data that is compared against the relationship graph. In some embodiments, a connectivity result may be associated with a connectivity strength, which may indicate how strong a relationship within the relationship graph is between the input and the result. In some embodiments, a connectivity strength may be based on a relationship score represented in the relationship graph. In some embodiments, a connectivity strength may be based on a number of degrees of separation between the input and the result in the relationship graph. In some embodiments, a connectivity strength may be a numerical value.

In some embodiments, user preference results may comprise historical usage of utterances and entity values for a user. In some embodiments, user preference results may be in the form of matches between a user's entry and the user's previous entries and/or selections.

In some embodiments, auto-suggest results may comprise matches to data that contains one or more utterances and/or entities that are the same for all users (e.g., are not specifically tailored to any particular user In some embodiments, connectivity results, user preference results, and/or auto-suggestion results may be collectively analyzed. For example, connectivity results may include a numerical value, user preference results may comprise a weight value indicating how much weight is to be given to user preference, and auto-suggestion results may comprise a derived score based on ranked matching. A respective weight may be assigned to each source (e.g., to each of the connectivity results, user preference results, and/or auto-suggestion results) and multiplied by the corresponding value/score, providing a respective weighted score for each source. The weighted scores may then be aggregated collectively. In some embodiments, once the weighted scores are presented for aggregation, logic may be applied to identify which results are similar and which are different. In some embodiments, based on similarities and differences, weights may be updated for one or more of the sources. Finally, weighted results may be sorted and prepared to be returned to a querying system. In some embodiments, scoring techniques such as this may be used recursively for scoring aggregated results generated by the scoring analysis, with other aggregated scoring analysis done on similar relevancy types.

In some embodiments, relevancy types may comprise entity types such as person, client, place, date, etc. In some embodiments, relevancy types may comprise intent and utterance. In some embodiments, relevancy types may be used to classify and/or categorize one or more results returned by the system responsive to a query, such that a user may see which results correspond to what relevancy types. In some embodiments, similar relevancy types may be compared to the same type of data patterns or types (e.g., utterance scores may be compared to other utterance scores, entity scores may be compared to other entity scores, etc.). In some embodiments, results including relevancy types including two or more different relevancy types may be collectively analyzed and/or compared against one another.

At block 810, in some embodiments, generating the set of predictive options comprises applying a collective ranking analysis to the rated and ranked lists received in the payloads. In some embodiments, applying a collective ranking analysis to the results received in the ranked lists from the microservices may comprise evaluating results on the basis of confidence scores included in the received payloads (optionally following normalizing the confidence scores included in the received payloads). In some embodiments, applying a collective ranking analysis to the results received in the ranked lists from the microservices may comprise evaluating the results on the basis of criteria not considered in calculating the confidence scores included in the received payloads.

At block 812, in some embodiments, predictive intent system 104 may cause display of the set of predictive options to the user. In some embodiments, predictive intent system may transmit data to user device 102 to cause user device 102 to display the set of predictive options to the user, for example such that the user may select a preferred and/or intended one of the predictive options.

At block 814, in some embodiments, predictive intent system 104 may cause execution of one or more conversation models in accordance with one or more predictive options in the set of predictive options. In some embodiments, predictive intent system 104 may itself execute (or may cause another system component inside or outside system 100 to execute) one or more conversation models associated with or identified by one of the options in the set of predictive options, or may itself execute (or may cause another system component inside or outside system 100 to execute) one or more conversation models using an entity or an utterance identified by one of the options in the set of predictive options. In some embodiments, a user may select one of the predictive options displayed at block 812, and the system may then cause execution of a conversation model at block 814 using the option selected by the user at block 812.

Exemplary Graphical User Interfaces

Figure 9:
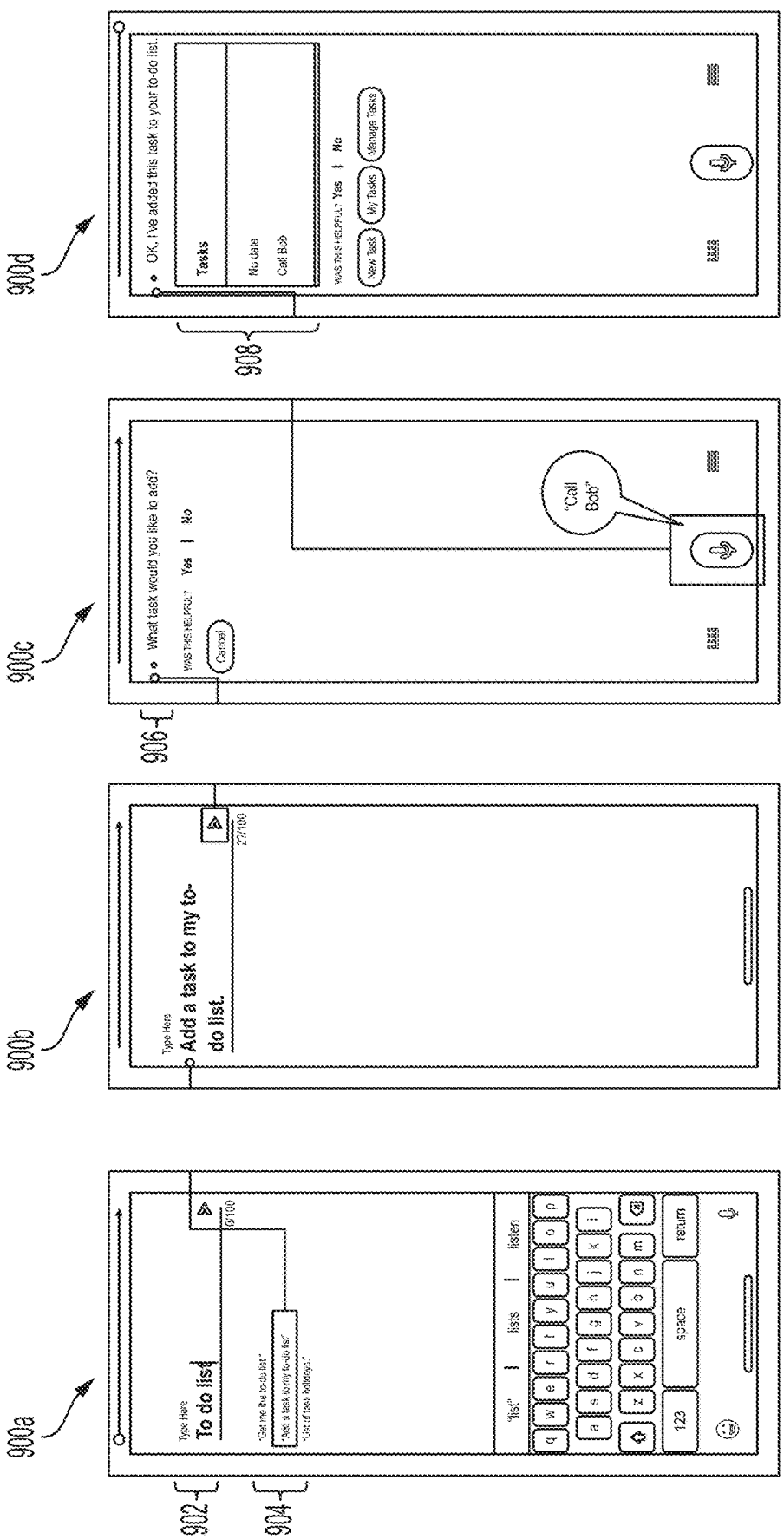
FIGS. 9A-9D depict exemplary graphical user interfaces of a system for language processing and execution of conversation models, in accordance with some embodiments.
Figure 10:
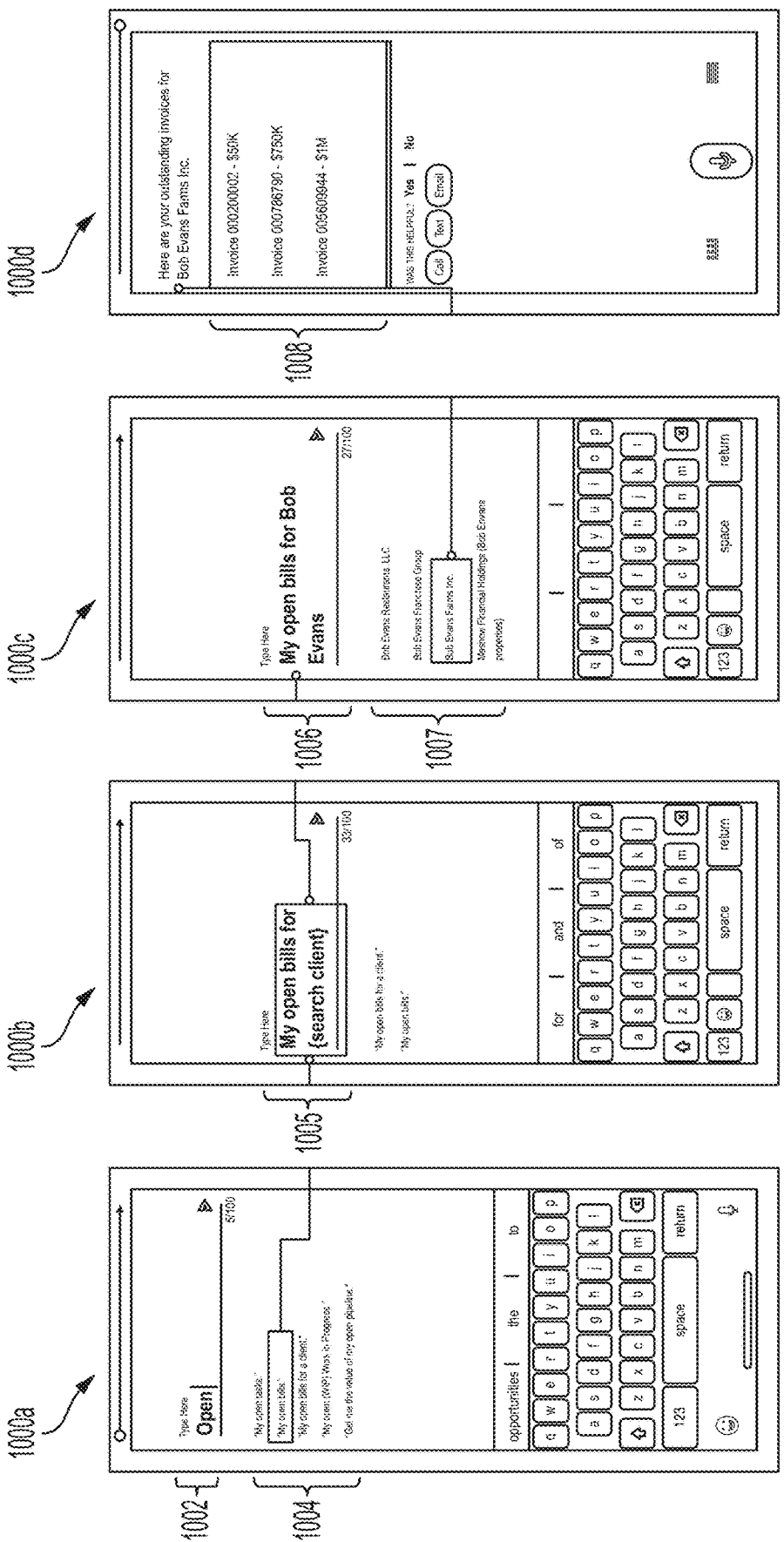
FIGS. 10A-10D depict exemplary graphical user interfaces of a system for language processing and execution of conversation models, in accordance with some embodiments.
Figure 11:
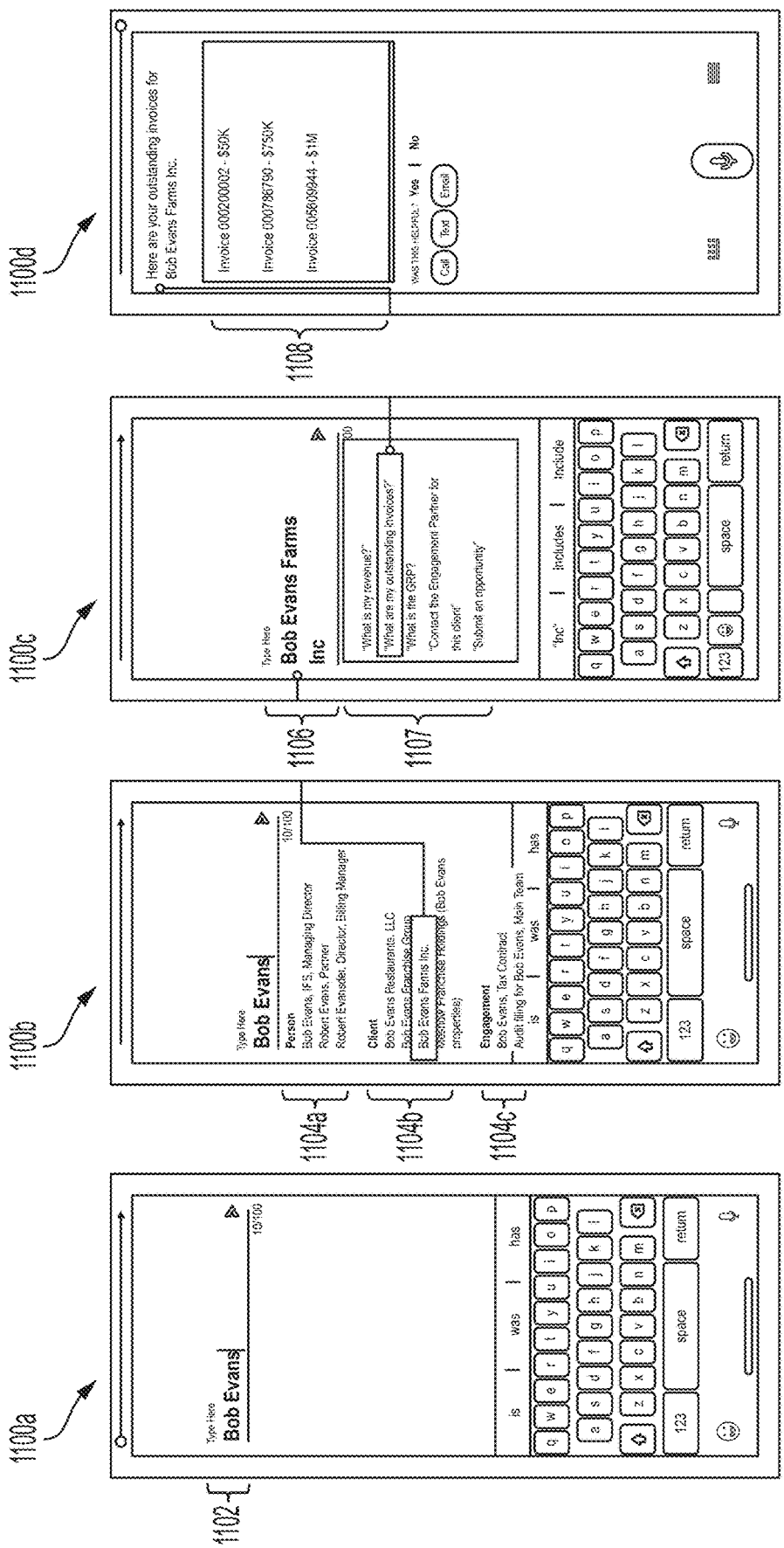
FIGS. 11A-11D depict exemplary graphical user interfaces of a system for language processing and execution of conversation models, in accordance with some embodiments.

FIGS. 9-11 show exemplary user interfaces for interacting with a natural language understanding system such as the systems described herein. In some embodiments, the graphical user interfaces shown in FIGS. 9-11 may be implemented by a user device such as user device 102 in system 100 as discussed above with respect to FIG. 1.

FIGS. 9A-9D depict graphical user interface 900, which includes screens 900a-d, in accordance with some embodiments. FIGS. 9A-9D show an example of a user querying a natural language understanding system via a typed utterance and then selecting a predictive utterance displayed by the system, after which the system executes a conversation model in accordance with the user's selected utterance.

At FIG. 9A, screen 900a includes field 902 into which a user may type an utterance. In the example shown, the user types "To do list." Based on this inputted utterance, the system executes one or more natural language understanding methods such as those disclosed herein, to query a plurality of microservices to analyze the utterance and to generate a set of predictive options. As shown in screen 900a, predictive options 904, generated by the system, are displayed to the user. In this example, the user selects the second one of the predictive options, which is a predictive utterance reading "Add a task to my to-do list."

In accordance with the user's selection of the predictive utterance displayed at screen 900a and the user's confirmation of his or her intent at screen 900b in FIG. 9B, the system may execute a conversation model associated with the selected utterance "Add a task to my to-do list." As shown in FIG. 9C at screen 900c, the system may execute a conversation model causing the system to prompt the user via prompt 906 to specify information about a task to be added to a to-do list. As shown at screen 900c, the user in this example may indicate (e.g., via spoken text) that the task to be added is to "Call Bob."

Finally, as shown at FIG. 9D, screen 900d may display confirmation 908 showing that the conversation model has successfully been executed to add the task "Call Bob" to the user's to-do list.

FIGS. 10A-10D depict graphical user interface 1000, which includes screens 1000a-d, in accordance with some embodiments. FIGS. 10A-10D shows an example of a user querying a natural language understanding system via a typed utterance and then selecting a predictive utterance displayed by the system, after which the system prompts the user to specify an entity value associated with an intent indicated by the selected predictive utterance. The system then displays predictive entities based on the user's second input, and the user selects one of the predictive entities. Based on the selected utterance and the selected entity, the system may then execute an associated conversation model.

At FIG. 10A, screen 1000a includes field 1002 into which a user may type an utterance. In the example shown, the user types "Open." Based on this inputted utterance, the system executes one or more natural language understanding methods such as those disclosed herein, to query a plurality of microservices to analyze the utterance and to generate a set of predictive options. As shown in screen 1000a, predictive options 1004, generated by the system, are displayed to the user. In this example, the user selects the second one of the predictive options, which is a predictive utterance reading "My open bills."

In accordance with the user's selection of the predictive utterance displayed at screen 1000a, the system displays a representation 1005 of the selected predictive utterance and an entity field, indicated in curly brackets, at screen 1000b. As shown by representation 1005, the selected utterance has an entity field for a client to whom the open bills correspond: "My open bills for {search client}."

After the user confirms his or her intent at screen 1000b in FIG. 10B, the system may display prompt 1006 at screen 1000c, shown in FIG. 10C, to prompt the user to type an utterance to be used to search for a client to be associated with the "My open bills" utterance. In this example, the user types the client search utterance "Bob Evans," and the system responsively executes one or more natural language understanding methods such as those disclosed herein, to query a plurality of microservices to analyze the client search utterance and to generate a set of predictive entities. As shown in screen 1000c, predictive entities 1007, generated by the system, are displayed to the user. In this example, the user selects the third one of the predictive options, which is a predictive entity reading "Bob Evans Farms Inc."

As shown in FIG. 10D at screen 1000d, the system may responsively execute a conversation model causing the system to display open bills for the selected client. As shown at screen 1000d, the system may display information object 1008 showing the information associated with the selected "My open bills" utterance and the selected "Bob Evans Farms Inc." entity.

FIGS. 11A-11D depict graphical user interface 1100, which includes screens 1100a-d, in accordance with some embodiments. FIGS. 11A-11D shown an example of a user querying a natural language understanding system via a typed entity, then selecting a predictive entity displayed by the system, then selecting a predictive conversation model associated with the entity, after which the system executes the selected conversation model based on the selection of the conversation model and on the selected predictive entity.

At FIG. 11A, screen 1100a includes field 1102 into which a user may type an utterance. In the example shown, the user types "Bob Evans." Based on this inputted utterance, the system executes one or more natural language understanding methods such as those disclosed herein, to query a plurality of microservices to analyze the utterance and to generate a set of predictive options. As shown in screen 1100b, predictive options are shown in three sets 1104a-c of predictive entities: set 1104a shows predictive entities that are persons, set 1104b shows predictive entities that are clients, and set 1104c shows predictive entities that are engagements. In this example, the user selects the third predictive option in set 1104b, which is a predictive entity called "Bob Evans Farm Inc."

In accordance with the user's selection of the predictive entity, the system displays updated field 1106 at screen 1100c in FIG. 11C. In the updated field, the user may type input in the form of an additional utterance, but the field is automatically populated with an utterance corresponding to the name of the selected predictive entity: "Bob Evans Farms, Inc." In accordance with the automatically populated utterance, the system may automatically execute one or more natural language understanding methods such as those disclosed herein, to query a plurality of microservices to analyze the utterance and to generate a set of predictive conversation models (e.g., predictive intents) that are associated with the previously-selected predictive entity. As shown in screen 1100c, predictive conversation models 1107, generated by the system, are displayed to the user. In this example, the user selects the second one of the predictive conversation models, which is a conversation model called "What are my outstanding invoices?"

As shown in FIG. 11D at screen 1100d, the system may responsively execute the selected conversation model using the selected predictive entity, causing the system to display outstanding invoices for the selected client. As shown at screen 1100d, the system may display information object 1108 showing the information associated with the selected "What are my outstanding invoices?" utterance and the selected "Bob Evans Farms, Inc." client.

Exemplary Computer

Figure 12:
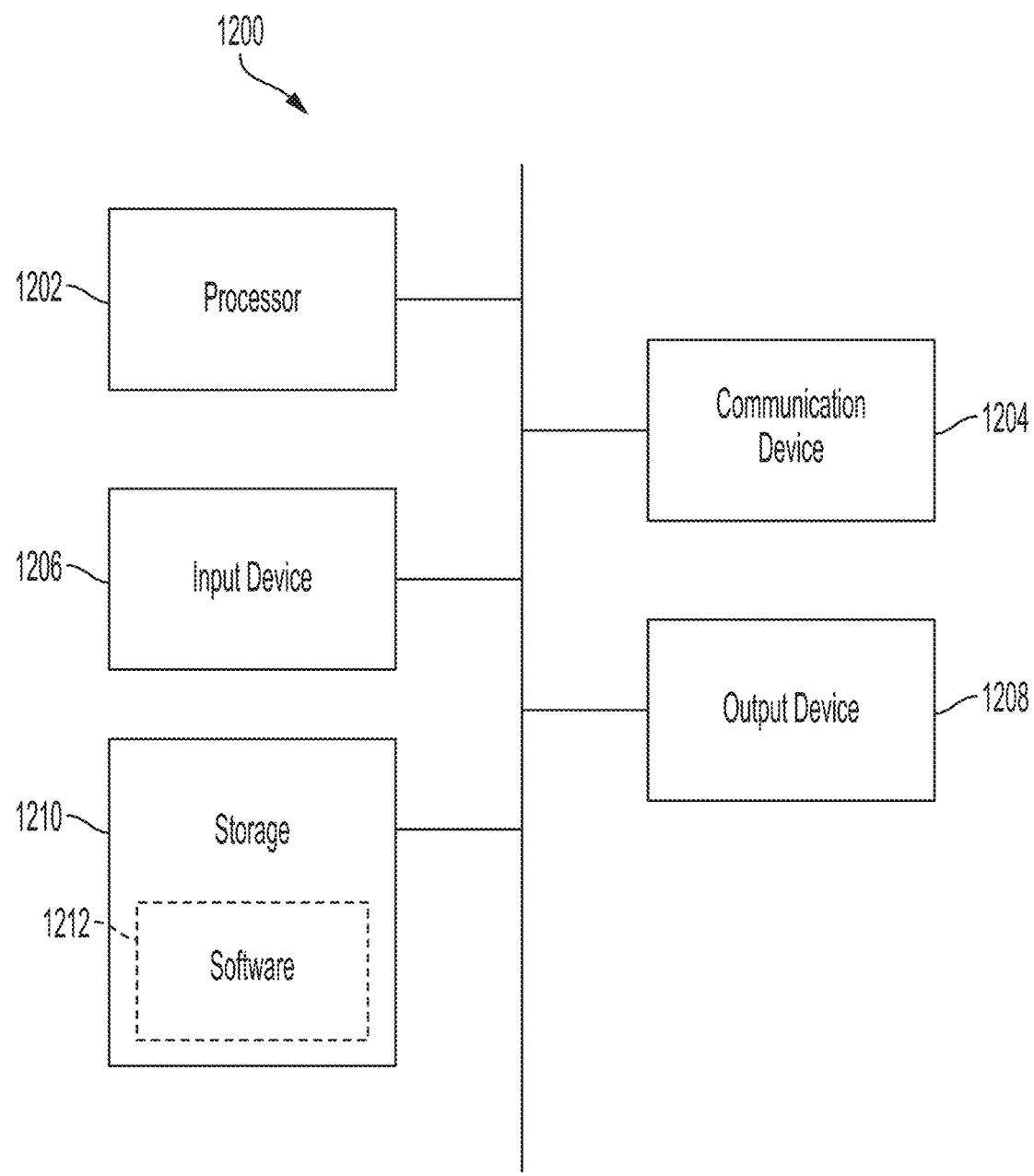
FIG. 12 depicts a computing system, in accordance with some embodiments.

FIG. 12 illustrates a computer, in accordance with some embodiments. Computer 1200 can be a component of a system for optimizing cooperative actions among heterogeneous autonomous connected machines, such as system 100 and/or any of its subcomponents described above with respect to FIG. 1. In some embodiments, computer 1200 may be configured to execute a method for natural language understanding, such as all or part of method 800 described above with respect to FIG. 8 and/or all or part of the methods described with respect to the microservices described in FIGS. 2-7.

Computer 1200 can be a host computer connected to a network. Computer 1200 can be a client computer or a server. As shown in FIG. 12, computer 1200 can be any suitable type of microprocessor-based device, such as a personal computer; workstation; server; or handheld computing device, such as a phone or tablet. The computer can include, for example, one or more of processor 1210, input device 1220, output device 1230, storage 1240, and communication device 1260.

Input device 1220 can be any suitable device that provides input, such as a touch screen or monitor, keyboard, mouse, or voice-recognition device. Output device 1230 can be any suitable device that provides output, such as a touch screen, monitor, printer, disk drive, or speaker.

Storage 1240 can be any suitable device that provides storage, such as an electrical, magnetic, or optical memory, including a RAM, cache, hard drive, CD-ROM drive, tape drive, or removable storage disk. Communication device 1260 can include any suitable device capable of transmitting and receiving signals over a network, such as a network interface chip or card. The components of the computer can be connected in any suitable manner, such as via a physical bus or wirelessly. Storage 1240 can be a non-transitory computer-readable storage medium comprising one or more programs, which, when executed by one or more processors, such as processor 1210, cause the one or more processors to execute methods described herein, such as method 800 described above with respect to FIG. 8 and/or all or part of the methods described with respect to the microservices described in FIGS. 2-7.

Software 1250, which can be stored in storage 1240 and executed by processor 1210, can include, for example, the programming that embodies the functionality of the present disclosure (e.g., as embodied in the systems, computers, servers, and/or devices as described above). In some embodiments, software 1250 can be implemented and executed on a combination of servers such as application servers and database servers.

Software 1250 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1240, that can contain or store programming for use by or in connection with an instruction execution system, apparatus, or device.

Software 1250 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 1200 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1200 can implement any operating system suitable for operating on the network. Software 1250 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A natural language understanding system comprising one or more processors and memory storing instructions configured to be executed by the one or more processors to cause the system to:
   receive an utterance input from a user;
   transmit query data regarding the input received from the user to a plurality of language processing microservices, wherein each of the plurality of language processing microservices is configured to:
      apply a respective algorithm to compare the query data to a respective data source Comprising one or more of (1) entities and (2) utterances;
      apply a respective rating algorithm to generate a ranked list based on the entities and/or utterances represented by the respective data source; and
      generate a respective query response payload, wherein generating the payload comprises selecting, based on the ranked list, a respective subset of the entities and/or utterances;
   receive, from each of the plurality of microservices, a respective payload comprising the respective subset of entities and/or utterances along with their associated respective ratings;
   generate, based on the entities and/or utterances included in ranked lists received from the plurality of microservices, a set of predictive options;
   cause display of the set of predictive options to the user, wherein each of the predictive options in the set comprises at least one of the following: (1) a suggested entity, and (2) a suggested utterance;
   detect a predictive option selection input from the user indicating selection of one of the displayed predictive options, wherein the one of the displayed predictive options selected comprises a selected suggested utterance;
   in accordance with the predictive option selected by the predictive option selection input, execute an interactive conversation model;
   in response to detecting the predictive option selection input selecting the selected suggested utterance, display an entity prompt for the user to enter an entity data input;
   receive an entity data input from the user;
   in response to receiving the entity data input, forward the entity data input to one or more of the plurality of microservices;
   receive, from each of the one or more of the plurality of microservices, a respective entity payload comprising a respective set of entities and associated respective ratings;
   generate, based on the sets of entities received in the one or more entity payloads, a set of suggested entities; and
   cause display of the set of suggested entities to the user.

2. The system of claim 1, wherein the instructions are further configured to cause the system to:
   detect a suggested entity selection input from the user indicating selection of one of the displayed suggested entities; and
   in accordance with the suggested entity selected by the suggested entity selection input, execute an interactive conversation model.

3. The system of claim 1, wherein one or more of the respective data sources is configured to be populated by a conversation modeling system.

4. The system of claim 1, wherein one or more of the respective data sources is configured to be populated by an API push/pull request.

5. The system of claim 1, wherein one or more of the respective data sources is configured to be populated by information from a streaming service topic.

6. The system of claim 1, wherein one or more of the respective rating algorithms is configured to assign confidence scores, based on the utterance input, to entities and/or utterances included in the respective data source.

7. The system of claim 6, wherein selecting the respective subset of the entities and/or utterances comprises applying a threshold to the confidence scores.

8. The system of claim 7, wherein the threshold is set in accordance with a highest confidence score among confidence scores for a respective microservice.

9. The system of claim 1, wherein generating the set of predictive options comprises applying a collective ranking algorithm to the entities and/or utterances included in ranked lists received from the plurality of microservices.

10. The system of claim 1, wherein generating the set of predictive options comprises normalizing confidence scores included in the ranked lists received from the plurality of microservices.

11. The system of claim 1, wherein one or more of the plurality of language processing microservices comprises an intent detection service configured to detect one or more intents based on the utterance input.

12. The system of claim 1, wherein one or more of the plurality of language processing microservices comprises an entity extraction service configured to extract one or more entities from the utterance input.

13. The system of claim 1, wherein one or more of the plurality of language processing microservices comprises an utterance lookup service configured to provide suggested utterances based on the utterance input.

14. The system of claim 1, wherein one or more of the plurality of language processing microservices comprises an entity lookup service configured to provide suggested entities based on the utterance input.

15. The system of claim 1, wherein one or more of the plurality of language processing microservices comprises a well-known utterance service configured to provide suggested well-known utterances based on the utterance input.

16. The system of claim 1, wherein one or more of the plurality of language processing microservices comprises a reading comprehension service configured to provide responses based on content extracted from one or more documents.

17. The system of claim 1, wherein one or more of the plurality of language processing microservices comprises an enterprise insights and profiling service configured to provide suggested entities and/or suggested utterances based on the utterance input and a data structure indicating relationship scores among entities and intents.

18. The system of claim 1, wherein the instructions are further configured to cause the system to select the plurality of language processing microservices from a set of available microservices.

19. The system of claim 18, wherein selecting the plurality of microservices is based on the utterance input.

20. The system of claim 19, wherein selecting the plurality of microservices based on the utterance input comprises selecting one or more of the plurality of microservices in accordance with a determination as to whether the utterance input comprises typed characters.

21. The system of claim 19, wherein selecting the plurality of microservices based on the utterance input comprises selecting one or more of the plurality of microservices in accordance with a determination as to whether the utterance input comprises spoken words.

22. The system of claim 18, wherein selecting at least one microservice of the plurality of microservices is based on an output generated by another one of the plurality of microservices.

23. A natural language understanding system comprising one or more processors and memory storing instructions configured to be executed by the one or more processors to cause the system to:
  receive an utterance input from a user;
  transmit query data regarding the input received from the user to a plurality of language processing microservices, wherein each of the plurality of language processing microservices is configured to:
    apply a respective algorithm to compare the query data to a respective data source comprising one or more of (1) entities and (2) utterances;
    apply a respective rating algorithm to generate a ranked list based on the entities and/or utterances represented by the respective data source; and
    generate a respective query response payload, wherein generating the payload comprises selecting, based on the ranked list, a respective subset of the entities and/or utterances;
  receive, from each of the plurality of microservices, a respective payload comprising the respective subset of entities and/or utterances along with their associated respective ratings;
  generate, based on the entities and/or utterances included in ranked lists received from the plurality of microservices, a set of predictive options;
  cause display of the set of predictive options to the user, wherein each of the predictive options in the set comprises at least one of the following: (1) a suggested entity, and (2) a suggested utterance;
  detect a predictive option selection input from the user indicating selection of one of the displayed predictive options, wherein the one of the displayed selected predictive options comprises a selected suggested entity;
  in accordance with the predictive option selected by the predictive option selection input, execute an interactive conversation model;
  in response to detecting the predictive option selection input selecting the suggested entity, display a set of suggested utterances that utilize the selected suggested entity;
  detect a suggested utterance selection input from the user indicating selection of one of the displayed suggested utterances; and
  in accordance with the suggested utterance selected by the suggested utterance selection input, execute an interactive conversation model.

24. A method for natural language understanding configured to be performed by a natural language understanding system comprising one or more processors, the method comprising:
  receiving an utterance input from a user;
  transmitting query data regarding the input received from the user to a plurality of language processing microservices, wherein each of the plurality of language processing microservices is configured to:
    apply a respective algorithm to compare the query data to a respective data source comprising one or more of (1) entities and (2) utterances;
    apply a respective rating algorithm to generate a ranked list based on the entities and/or utterances represented by the respective data source; and
    generate a respective query response payload, wherein generating the payload comprises selecting, based on the ranked list, a respective subset of the entities and/or utterances;
  receiving, from each of the plurality of microservices, a respective payload comprising the respective subset of entities and/or utterances along with their associated respective ratings;
  generating, based on the entities and/or utterances included in ranked lists received from the plurality of microservices, a set of predictive options;
  causing display of the set of predictive options to the user, wherein each of the predictive options in the set comprises at least one of the following: (1) a suggested entity, and (2) a suggested utterance;
  detecting a predictive option selection input from the user indicating selection of one of the displayed predictive options, wherein the one of the displayed selected predictive options comprises a selected suggested utterance;
  in accordance with the predictive option selected by the predictive option selection input, executing an interactive conversation model;
  in response to detecting the predictive option selection input selecting the selected suggested utterance, displaying an entity prompt for the user to enter an entity data input;
  receiving an entity data input from the user;

in response to receiving the entity data input, forwarding the entity data input to one or more of the plurality of microservices;

receiving, from each of the one or more of the plurality of microservices, a respective entity payload comprising a respective set of entities and associated respective ratings;

generating, based on the sets of entities received in the one or more entity payloads, a set of suggested entities; and causing display of the set of suggested entities to the user.

25. A non-transitory computer-readable storage medium storing instructions for natural language understanding, the instructions configured to be executed by a natural language understanding system comprising one or more processors, the instructions configured to cause the system to:

receive an utterance input from a user;

transmit query data regarding the input received from the user to a plurality of language processing microservices, wherein each of the plurality of language processing microservices is configured to:

apply a respective algorithm to compare the query data to a respective data source comprising one or more of (1) entities and (2) utterances;

apply a respective rating algorithm to generate a ranked list based on the entities and/or utterances represented by the respective data source; and generate a respective query response payload, wherein generating the payload comprises selecting, based on the ranked list, a respective subset of the entities and/or utterances;

receive, from each of the plurality of microservices, a respective payload comprising the respective subset of entities and/or utterances along with their associated respective ratings;

generate, based on the entities and/or utterances included in ranked lists received from the plurality of microservices, a set of predictive options;

cause display of the set of predictive options to the user, wherein each of the predictive options in the set comprises at least one of the following: (1) a suggested entity, and (2) a suggested utterance;

detect a predictive option selection input from the user indicating selection of one of the displayed predictive options, wherein the one of the displayed selected predictive options comprises a selected suggested utterance;

in accordance with the predictive option selected by the predictive option selection input, execute an interactive conversation model;

in response to detecting the predictive option selection input selecting the selected suggested utterance, display an entity prompt for the user to enter an entity data input;

receive an entity data input from the user;

in response to receiving the entity data input, forward the entity data input to one or more of the plurality of microservices;

receive, from each of the one or more of the plurality of microservices, a respective entity payload comprising a respective set of entities and associated respective ratings;

generate, based on the sets of entities received in the one or more entity payloads, a set of suggested entities; and cause display of the set of suggested entities to the user.

\* \* \* \* \*